(12) United States Patent
Distler

(10) Patent No.: US 8,866,841 B1
(45) Date of Patent: Oct. 21, 2014

(54) METHOD AND APPARATUS TO DELIVER IMAGERY WITH EMBEDDED DATA

(76) Inventor: Joshua Distler, Brooklyn, NY (US)

( * ) Notice: Subject to any disclaimer, the term of this patent is extended or adjusted under 35 U.S.C. 154(b) by 779 days.

(21) Appl. No.: 12/754,419

(22) Filed: Apr. 5, 2010

Related U.S. Application Data

(60) Provisional application No. 61/166,554, filed on Apr. 3, 2009.

(51) Int. Cl.
*G09G 5/00* (2006.01)

(52) U.S. Cl.
USPC .......................................................... 345/619

(58) Field of Classification Search
None
See application file for complete search history.

(56) References Cited

U.S. PATENT DOCUMENTS

| | | | | |
|---|---|---|---|---|
| 5,974,198 | A * | 10/1999 | Hamburg et al. | 382/284 |
| 6,715,127 | B1 * | 3/2004 | Eschbach et al. | 715/202 |
| 2007/0146389 | A1 * | 6/2007 | Distler | 345/629 |

OTHER PUBLICATIONS

Dinardi http://web.archive.org/web/20081103062300/http://emptyeasel.com/2008/10/31/explaining-blending-modes-in-photoshop-and-gimp-multiply-divide-overlay-screen, Nov. 3, 2008.*
Mallick "Feature Based Image Mosaicing", Department of Electrical and Computer Engineering, University of California, San Diego, Dec. 2002.*
Distler, Joshua, co-pending U.S. Appl. No. 11/615,216, filed Dec. 22, 2006.

* cited by examiner

*Primary Examiner* — Xiao Wu
*Assistant Examiner* — Yingchun He
(74) *Attorney, Agent, or Firm* — Steven R. Vosen

(57) ABSTRACT

The present invention is directed to the realistic three-dimensional presentation of images in scenes, and is particularly useful for providing and tailoring artwork to appear on scene. In one embodiment, reserved names, such as reserved ink names, are provided to artwork, which results in the image being modified, such as by filling with a surface image, modifying layers properties, and/or turning layers on or off. In another embodiment, resizing of objects is provided in 2.5D or 3-D. In yet another embodiment, automatic adjustment of layer opacity, highlighting and/or shading is provided to artwork provided to a scene to provide a more realistic look.

48 Claims, 14 Drawing Sheets

FIG. 2
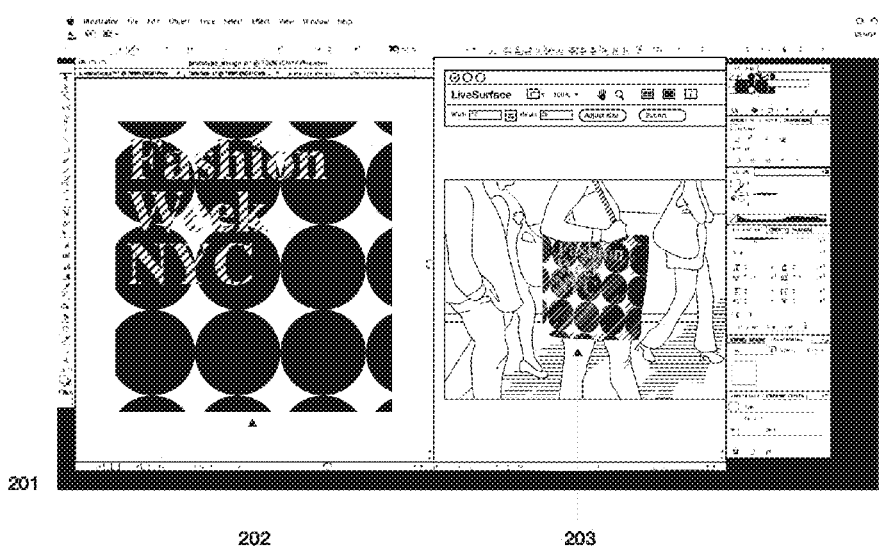
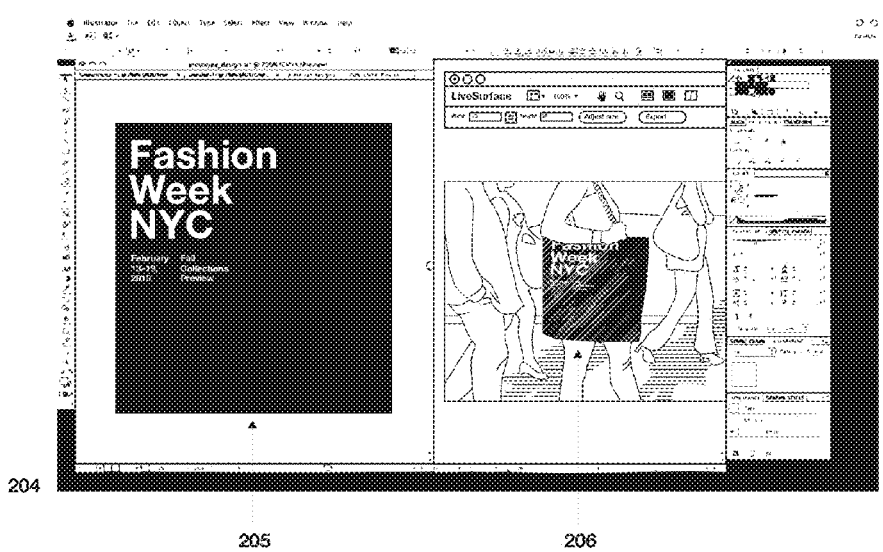

FIG. 6
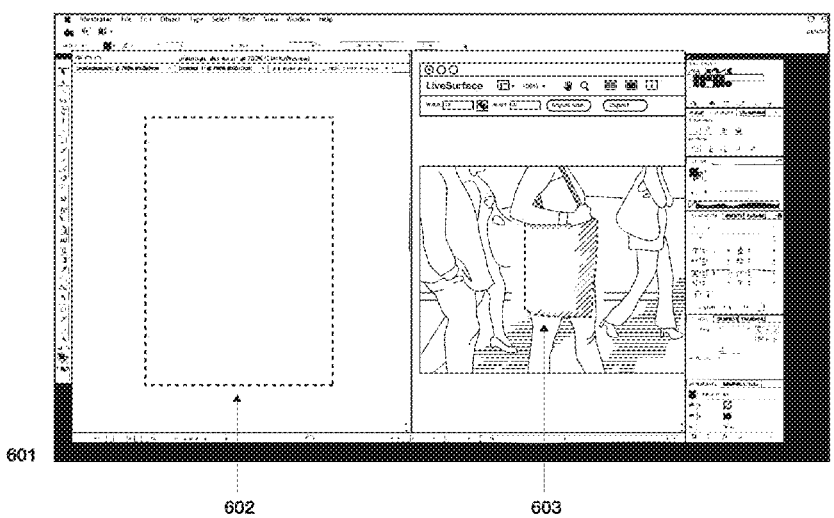
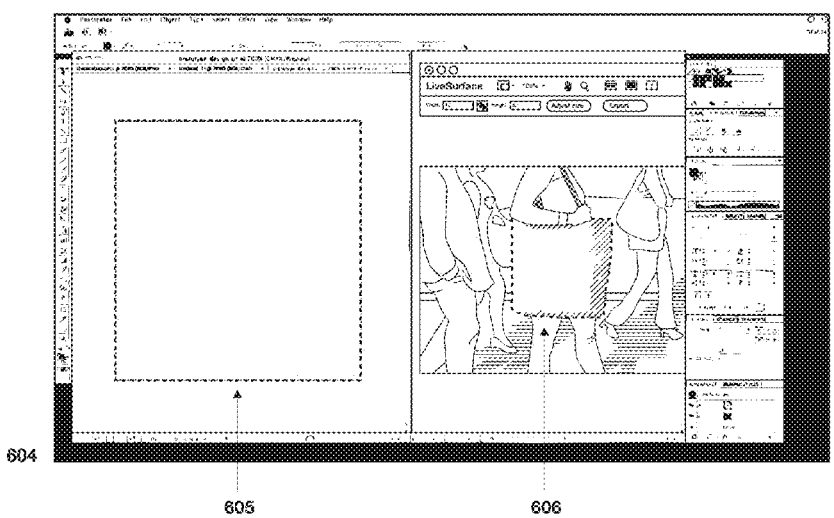

FIG. 11

| | | |
|---|---|---|
| 1101 | | |
| | thumbnail/preview | 1104 |
| | surface images/textures as individual elements | 1105 |
| | default surface and effects masks + ko | 1106 |
| | 3D structures | 1107 |
| | shadow | 1108 |
| | background | 1109 |

| | | |
|---|---|---|
| 1102 | | |
| | thumbnail/preview | 1110 |
| | surface images/textures as individual elements | 1111 |
| | default surface and effects masks + ko | 1112 |
| | 3D structures | 1113 |
| | shadow | 1114 |
| | background | 1115 |

| | | |
|---|---|---|
| 1103 | | |
| 10-50 | demensioning limits | 1116 |
| -45–+45 x, y | viewing angle limits | 1117 |
| | user artboard guides | 1118 |
| 0,0,1, 255 | default preferences/ settings | 1119 |
| blur: YES vignette: NO | effects settings | 1120 |
| 1: 0=20 2: 100=65 | user slider ranges | 1121 |
| black=+30 white=-20 | auto-adjustment preferences | 1122 |
| image#1234 | image serial | 1123 |
| user#5678 | user id number | 1124 |
| A023F9B123 35890CC920 | file encryption key | 1125 |
| printers, die line, background... | image details | 1126 |
| shadow, highlight, user artwork... | layered scene/object image target structure | 1127 |
| ambient light, light strength, light color... | environmental settings | 1128 |

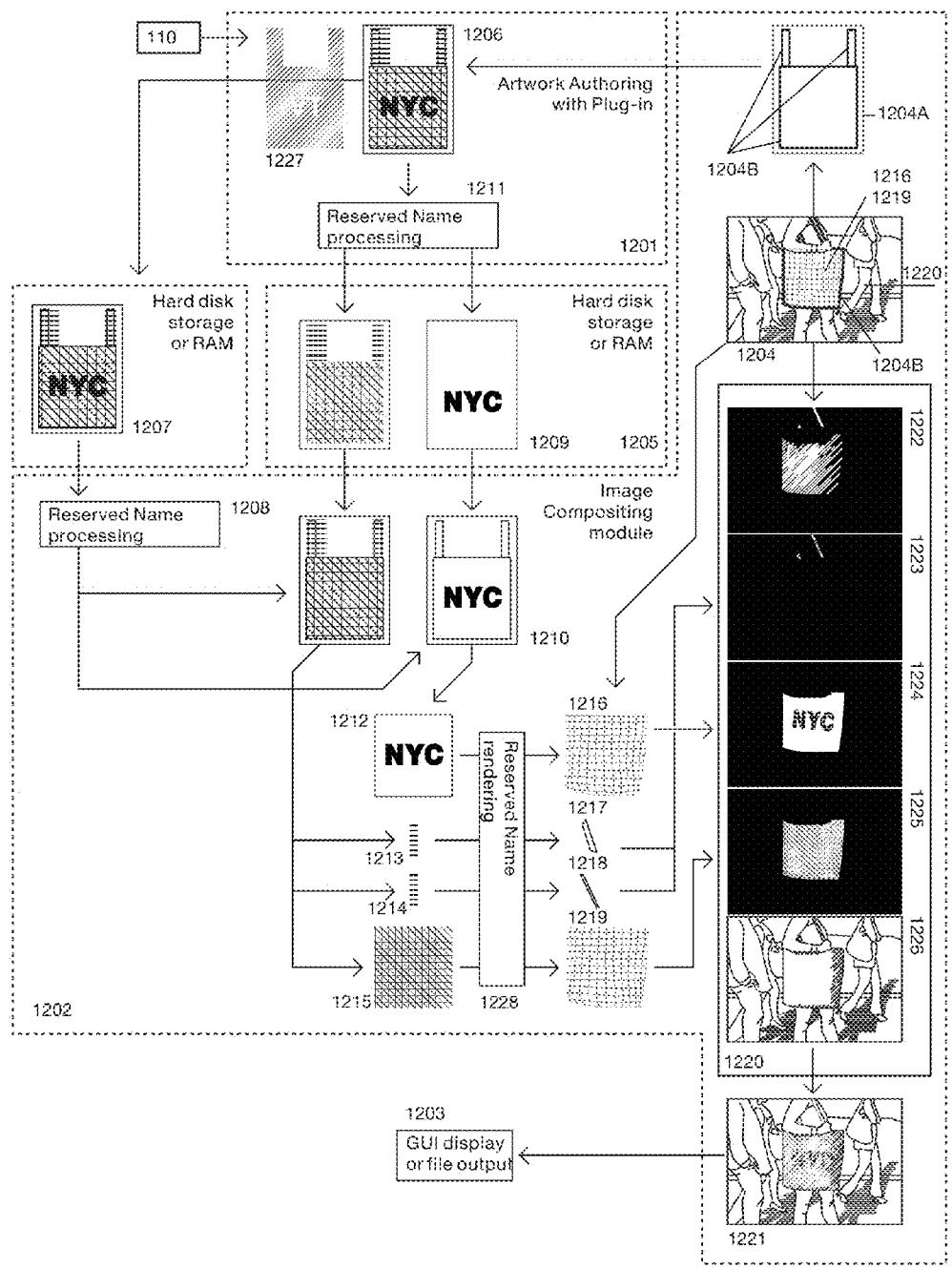

METHOD AND APPARATUS TO DELIVER IMAGERY WITH EMBEDDED DATA

CROSS-REFERENCE TO RELATED APPLICATIONS

This application claims the benefit of U.S. Provisional Application No. 61/166,554, filed Apr. 3, 2009, the entire contents of which is hereby incorporated by reference herein and made part of this specification.

BACKGROUND OF THE INVENTION

1. Field of the Invention

The present invention relates to the field of image generation. More particularly, the present invention relates to methods and apparatus that deliver imagery with embedded data that can be used to efficiently render design concepts.

2. Discussion of the Background

Graphic designers, artists and other creative producers typically use two techniques to present creative concepts in a manner which closely approximates the appearance of the final product. The first technique is that of physically building a prototype. Construction of a design prototype (e.g., for product packaging) typically requires the output of the design or artwork onto a material suitable in flexibility and strength for the building of prototype. The design or artwork is output onto paper using various printing techniques (including, for example, hand printing and inkjet printing), glued to a stiff material such as, for example, cardboard, trimmed and then folded and glued into final form. The difficulty of constructing a prototype varies greatly and depends on the complexity and form of the final design. For concepts that require materials other than paper or cardboard (e.g., translucent materials) "mocking up" (as this physical building process is called) can be extremely time consuming and costly. Once the concept is constructed it may be traditionally presented in physical form. Photographs of the physical concept may be made and presented in lieu of the concept, especially when transport of the physical concept is impractical.

Recently, artists and designers have begun to use computers to develop ideas. In addition the development of the Internet has led to the use of email as a common method for exchanging text and imagery. The wide-spread use and integration of software which can read and write high resolution image data in many file formats (including, but not limited to, Portable Document Format (PDF), Tagged Image File Format (TIFF), or Joint Photographic Experts Group (JPEG) formats) as well as increasingly available broadband connections to email and the web have greatly increased the use of high resolution imagery in representing various kinds of information.

Designers often exchange images with clients to represent design concepts. However, the ability to precisely communicate the subtle details and form of a design is lacking. Commonly, designers provide flat graphic representations of the concept to clients. These flat graphic representations lack the three-dimensional form and photographic cues to properly illustrate the design concept.

Simulating a design concept three-dimensionally on a computer is recent in comparison to constructing a design concept physically. Here, the process typically begins with constructing a virtual model "wireframe" on a computer inside a three-dimensional application. The artwork or design is then imported into the three-dimensional application and applied to a three-dimensional object. Lighting is set up inside the virtual scene, the virtual "camera" is positioned and a final image is rendered. This technique is also quite time consuming and requires a very specialized skill set which the artist or designer who created the concept rarely possesses. An important deficiency of this technique is that a reduction in the time spent building, lighting and rendering the model usually results in a substantially less realistic final rendering of the concept.

A hybrid of the two concepts is a promising approach. Here, a photograph of a "real" object or scene with computer imagery rendered onto the surface provides the realism of an actual photograph combined with the speed and convenience of three-dimensional rendering. However, constructing and photographing the object is still quite time consuming.

PHOTOSHOP® (Adobe Systems Inc., San Jose, Calif.) is one example of a software application specifically designed for compositing imagery which is commonly used by photographers, retouchers, effects artists and designers to compose a final image from a number of photographic sources. Image compositing software such as PHOTOSHOP® provides a useful method for applying artwork to a photographic surface with image layers and multiple compositing settings.

Many companies, commonly known as "stock photo agencies," sell "stock" illustration and photography to a worldwide market. Stock photo agencies sell images and illustrations of various objects and scenes for reuse by artists and designers.

Some companies sell "cut out" images (photos of objects with background and shadow information completely removed that have been placed on a solid white background). These images are solely flat images (i.e., they contain only one plane of image data where, for example, the white background runs together with the object image data as one continuous image). Occasionally, the images contain vector path data which allows an image to be trimmed out to appear on a transparent background.

The process for using these cut out images to create an on-screen photographic design composite is still quite time-consuming and complex since imagery applied to the surfaces of the objects or scenes depicted in these stock photos must be manipulated, stretched and hand trimmed in order to fit a surface. Without additional sophisticated retouching, a design concept cannot be pasted onto stock art, which are flat files that lack critical surface data.

Thus, current stock photos are only slightly more efficient than directly photographing the object. Accordingly, what is needed is photographic imagery which contains the necessary trimming and surface data to trim and map pasted artwork within a common compositing application such as, for example, PHOTOSHOP®, that provides efficient methods of producing.

Thus there is a need in the art for a method and apparatus that permits for a user to generate highly sophisticated artwork with a minimal amount of skill. The method and apparatus should be capable of rendering realistic geometries and/or surfaces, and permit modification of the image or scene with a minimal amount of user input.

BRIEF SUMMARY OF THE INVENTION

In certain embodiments, a data file is provided that includes imagery and embedded data that can be used to efficiently render design concepts.

Certain embodiments provide a method for operating a computer executing an imaging application to render a layered image file on a computer display, where the imaging application includes reserved names. The method includes accepting artwork into a layer of an image file; determining if a reserved name is associated with a portion of the artwork; and modifying the image file according to the determined reserved name, where the modifying includes providing additional layers to the image file, such that the modifying affects the rendering of the portion.

Certain other embodiments provide a computer readable hardware storage medium storing computer readable instructions that, when executed by at least one processor of a processing system, cause the processing system to carry out a method. The method includes operating a computer executing an imaging application to render a layered image file on a computer display, where the imaging application includes reserved names. The method further includes accepting artwork into a layer of an image file; determining if a reserved name is associated with a portion of the artwork; and modifying the image file according to the determined reserved name, where the modifying includes providing additional layers to the image file, such that the modifying affects the rendering of the portion.

Certain embodiments provide a method for operating a computer executing an imaging application to render a layered image file on a computer display, where the imaging application includes reserved names. The method includes accepting artwork into a layer of an image file; determining if a reserved name is associated with a portion of the artwork; and modifying the image file according to the determined reserved name, where the modifying includes turning image file layers on or off, such that the modifying affects the rendering of the portion.

Certain other embodiments provide a computer readable hardware storage medium storing computer readable instructions that, when executed by at least one processor of a processing system, cause the processing system to carry out a method. The method includes operating a computer executing an imaging application to render a layered image file on a computer display, where the imaging application includes reserved names. The method further includes accepting artwork into a layer of an image file; determining if a reserved name is associated with a portion of the artwork; and modifying the image file according to the determined reserved name, where the modifying includes turning image file layers on or off, such that the modifying affects the rendering of the portion.

Certain embodiments provide a method for operating a computer executing an imaging application to render a layered image file on a computer display, where the imaging application includes reserved names. The method includes: accepting artwork into a layer of an image file; determining if a reserved name is associated with a portion of the artwork; and modifying the image file according to the determined reserved name, where the modifying includes changing the settings of the layer containing the artwork, such that the modifying affects the rendering of the portion.

Certain other embodiments provide a computer readable hardware storage medium storing computer readable instructions that, when executed by at least one processor of a processing system, cause the processing system to carry out a method. The method includes operating a computer executing an imaging application to render a layered image file on a computer display, where the imaging application includes reserved names. The method further includes: accepting artwork into a layer of an image file; determining if a reserved name is associated with a portion of the artwork; and modifying the image file according to the determined reserved name, where the modifying includes changing the settings of the layer containing the artwork, such that the modifying affects the rendering of the portion.

Certain embodiments provide a method for operating a computer executing an imaging application to render a layered image file on a computer display, where the imaging application includes reserved names. The method includes: accepting artwork into a layer of an image file; determining if a reserved name is associated with a portion of the artwork; and modifying the image file according to the determined reserved name, where the modifying includes filling the portion of the artwork with an image, such that the modifying affects the rendering of the portion.

Certain other embodiments provide a computer readable hardware storage medium storing computer readable instructions that, when executed by at least one processor of a processing system, cause the processing system to carry out a method. The method includes operating a computer executing an imaging application to render a layered image file on a computer display, where the imaging application includes reserved names. The method further includes: accepting artwork into a layer of an image file; determining if a reserved name is associated with a portion of the artwork; and modifying the image file according to the determined reserved name, where the modifying includes filling the portion of the artwork with an image, such that the modifying affects the rendering of the portion.

Certain embodiments provide a method for operating a computer to modify a layer image file for rendering an image on a display. The method includes: accepting a resizing command for an object, where the file includes embedded geometry data having a dimension greater than 2-D associated with the object, and where the file includes artwork associated with the object for rendering on the object; and performing a resizing operation of artwork corresponding to the resized object using the geometry data.

Certain other embodiments provide a computer readable hardware storage medium storing computer readable instructions that, when executed by at least one processor of a processing system, cause the processing system to carry out a method. The method includes operating a computer to modify a layer image file for rendering an image on a display. The method further includes: accepting a resizing command for an object, where the file includes embedded geometry data having a dimension greater than 2-D associated with the object, and where the file includes artwork associated with the object for rendering on the object; and performing a resizing operation of artwork corresponding to the resized object using the geometry data.

Certain embodiments provide a method for operating a computer to modify the rendering of an image file on a computer display. The method includes: accepting user supplied artwork into a layer of the image file; determining an attribute of the accepted artwork, where the attribute depends on the intensity of pixels within at least one portion of the artwork; and adjusting a layer setting of the image file according to artwork density, where the setting affects the rendering of the artwork.

Certain other embodiments provide a computer readable hardware storage medium storing computer readable instructions that, when executed by at least one processor of a processing system, cause the processing system to carry out a method. The method includes operating a computer to modify the rendering of an image file on a computer display. The method further includes: accepting user supplied artwork into a layer of the image file; determining an attribute of the accepted artwork, where the attribute depends on the intensity of pixels within at least one portion of the artwork; and adjusting a layer setting of the image file according to artwork density, where the setting affects the rendering of the artwork.

These features together with the various ancillary provisions and features which will become apparent to those skilled in the art from the following detailed description, are attained by the methods and apparatus of the present invention, preferred embodiments thereof being shown with reference to the accompanying drawings, by way of example only, wherein:

BRIEF DESCRIPTION OF THE SEVERAL VIEWS OF THE DRAWING

FIG. 2 illustrates an embodiment of the combination of layered imagery and software functionality using the components of FIG. 1;

FIG. 6 is one embodiment of the modules and components of FIG. 1 illustrating the resizing of images;

FIG. 11 is a diagram illustrating two embodiments of components/elements that may be loosely grouped or associated together or may be embedded into a file or files;

FIG. 12 is a functional diagram which shows how various components, or functionality modules, work together in another embodiment to create certain functionalities for the user;

Figure 1:
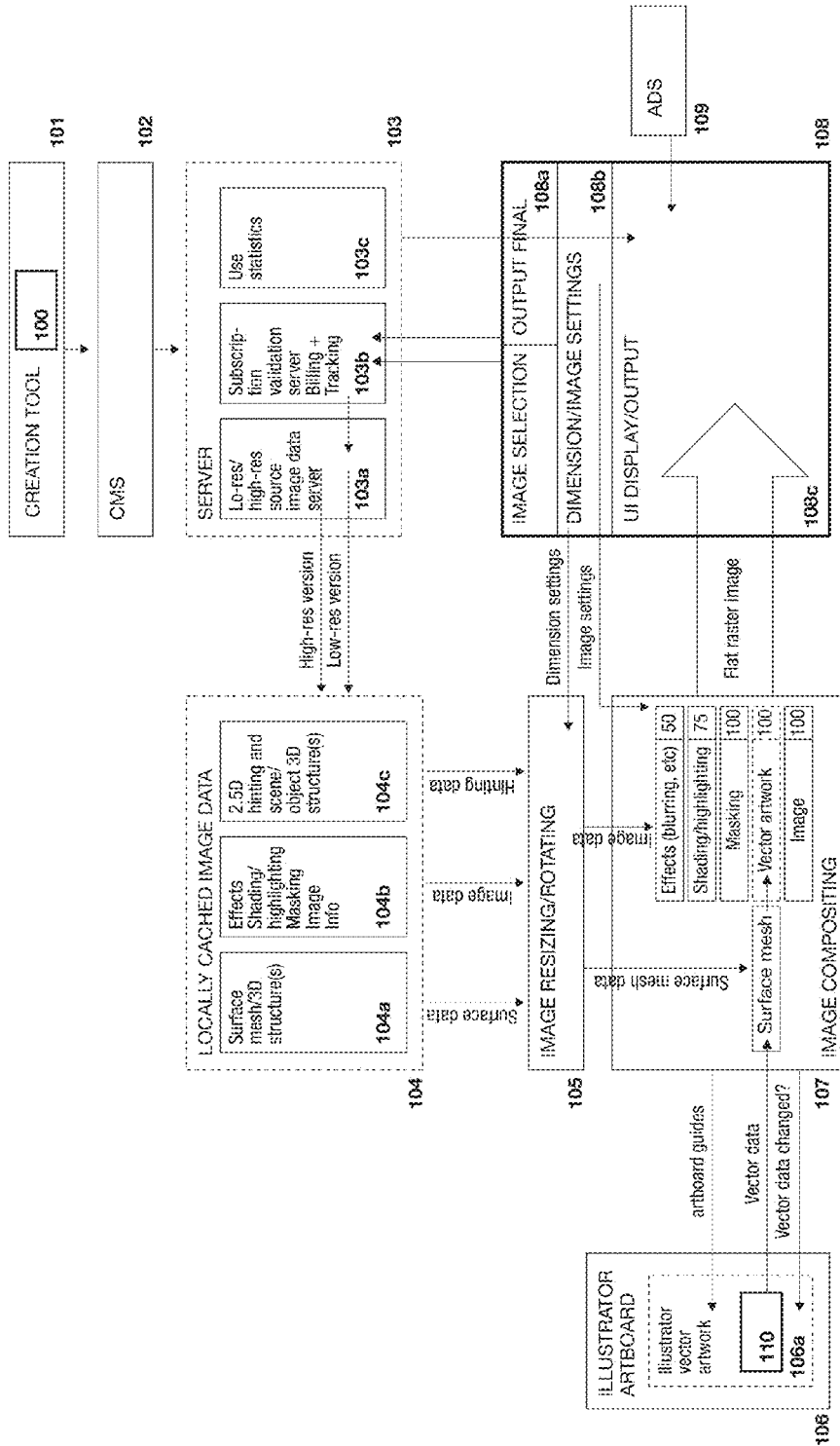
FIG. 1 is a functional diagram showing the interaction of one embodiment of various components and modules.

Reference symbols are used in the Figures to indicate certain components, aspects or features shown therein, with reference symbols common to more than one Figure indicating like components, aspects or features shown therein.

DETAILED DESCRIPTION OF THE INVENTION

Although certain preferred embodiments and examples are disclosed below, it will be understood by those skilled in the art that the inventive subject matter extends beyond the specifically disclosed embodiments to other alternative embodiments and/or uses of the invention, and to obvious modifications and equivalents thereof. Thus it is intended that the scope of the inventions herein disclosed should not be limited by the particular disclosed embodiments described below. Thus, for example, in any method or process disclosed herein, the acts or operations making up the method/process may be performed in any suitable sequence, and are not necessarily limited to any particular disclosed sequence. For purposes of contrasting various embodiments with the prior art, certain aspects and advantages of these embodiments are described where appropriate herein. Of course, it is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein. While the systems and methods discussed herein may be used for placing images so that they appear to be on three-dimensional scenes, the systems and methods can also be used in other ways: for example, to provide children's coloring-book image files with coloring areas that have 3-dimensional properties, or, for example, to provide image files for medicine where the image file will run a series of embedded edge finding and contrast enhancing effects on a user's image before scaling and masking the image for presentation in slide format.

Disclosed herein are data files, methods for generating data files, and apparatuses and methods for distributing and utilizing data files. In general, the data files are binary files that, when interpreted by an imaging application on a computer, produces an image. Such a data file is referred to herein, and without limitation, as a "file" or "image file." Since the data contained within an image file may be used to generate an image, the terms "file containing an image," "image file," and "image" are sometimes used interchangeably herein.

The term "imaging application" refers, without limitation, to computer programs or systems that can display, render, edit, manipulate, and/or composite image files. Some of the discussion herein utilizes terminology regarding file formats and the manipulation or structure of file formats that is commonly used with reference to the ILLUSTRATOR® (Adobe Systems Inc., San Jose, Calif.) imaging application. It is understood that this terminology is used for illustrative purposes only, and is not meant to limit the scope of the present invention.

In general, a file containing an image has a structure and/or format that is compatible for opening or inputting to an imaging application or that may be transformed or otherwise manipulated to be opened by or otherwise inputted to an imaging applications. Thus, for example, an image file may include binary data that conforms to an image file standard including, but not limited to, a PHOTOSHOP® TIFF or native PSD format. Such a file may then be opened, for example, by an imaging application including, but not limited to, PHOTOSHOP® or ILLUSTRATOR® and generate an image including, but not limited to, an image on a computer display or printer.

In certain embodiments, the image file is a "target image" or "source image" which is adapted to accept artwork, which is referred to herein and without limitation as "artwork" or "user artwork." The term "design application" refers, without limitation, to computer programs or systems or imaging applications utilized by a user to generate user artwork.

In another embodiment, a target image file includes embedded data that is used to distort some or all of the image or artwork provided to the target image. The embedded data, which is referred to herein, and without limitation, as "surface data," that is multi-dimensional and may, for example, correspond to or approximates the three-dimensional shape of an image surface.

Thus, as one example that is not meant to limit the present invention, the target image is a multi-layered file. A first layer includes an object and surface data that is used to distort a scene of a second layer so that it appears on the surface of the object. Thus, for example, the first layer may contain surface data corresponding to a three-dimensional object, such as an inclined plane, cylinder, sphere, or a more complex shape, and the second layer may be adapted to accept artwork (either a raster or vector image) that will, when composited, appear as if it were on the object surface. When the first and second layer are provided to the imaging application, the application distorts the second layer according to the embedded information of the first layer, producing an image of the scene as distorted by (or wrapped about) the surface data. Thus inclined plane surface data provides perspective to the scene, while cylindrical or spherical surface data distort the scene as it would appear if wrapped about the corresponding three-dimensional surface.

Figure 13:
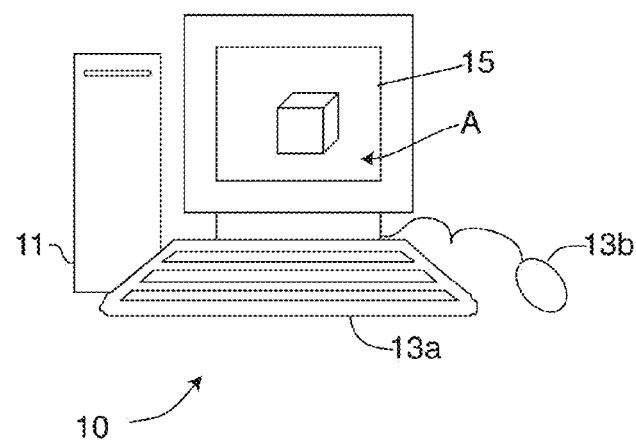
FIG. 13 is one embodiment of a computer system for viewing image files as described herein.

FIG. 13 is one embodiment of a computer system 10 for viewing image files as described herein. System 10 includes a processor and memory 11, one or more input devices 13, and a display 15. The input devices 13 include, but are not limited to a keyboard 13a and a graphical input device, such as a mouse 13b. Computer system 10 is particularly adapted for the production, manipulation, and or generation of images (shown, for example as image or graphical user interface (GUI) A on display 15), may also include additional devices (not shown) including but not limited to printers, additional displays, and additional or other input devices, and additional processors and/or memory. In one embodiment, computer system 10 includes the ability to execute instructions of an imaging application to generate or manipulate image files to produce images. Thus, for example and without limitation, computer, or processing system 10 and/or 20 may include computer readable hardware storage medium storing computer readable instructions that, when executed by at least one processor of a processing system, cause the processing system to carry out various methods, as described herein.

Figure 14:
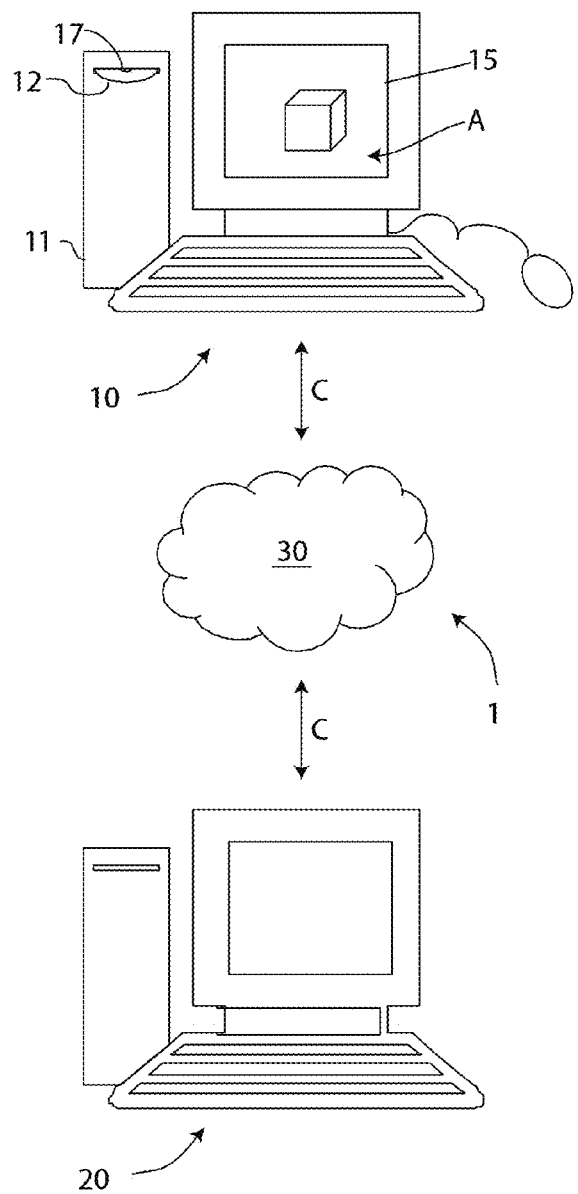
FIG. 14 is another embodiment of a system for viewing image files as described herein.

FIG. 14 is another embodiment of a system 1 for viewing image files as described herein. System 1 may be generally similar to the embodiment illustrated in FIG. 13, except as further detailed below. Where possible, similar elements are identified with identical reference numerals in the depiction of the embodiments of FIGS. 13 and 14.

System 1 illustrates a system for the transfer of image files or other information to or from computer system 10. As shown in FIG. 14, system 1 also includes a second computer system 20, and a network 30. Network 30 may be, but is not limited to, combinations of one or more wired and/or wireless networks adapted to transmit information between computers and may be, without limitation, the Internet or any other communication system. Computer systems 10 and 20 may communicate through network 30, as indicated by arrows C. Communications includes, but is not limited to, e-mail or the mutual access to certain web sites. In addition, FIG. 14 also shows a removable media device 17 of computer system 10, and a removable media 12 being inserted into media device 17. Removable media 12 may be, for example and without limitation, a readable or a read-write device capable of accessing information on a CD, DVD, or tape, or a removable memory device such as a Universal Serial Bus (USB) flash drive.

In one embodiment, image files, which may contain embedded data, are provided to computer system 10 on removable media 12. In another embodiment, image files, which may contain embedded data, are provided to computer system 10 from computer system 20 over network 30.

In another embodiment, the embedded data cannot be interpreted by the imaging application without providing the imaging application with access to additional software. Thus, for example, interpretation of embedded data by the imaging application may require additional software either within, or accessible to, the imaging application. The additional software may be provided to computer system 10, either with or separate from the image file, as a software upgrade to the imaging application or as a plug-in to the imaging application. The software upgrades or plug-ins may be provided to computer system 10 through media 12 or over network 30.

In one embodiment, image file is produced entirely on computer system 10. In a second embodiment, the image file is provided to computer system 10 via media 12 or network 30. In a third embodiment, the image file is provided to computer system 10 via media 12 or network 30, and may be uses as a "template" onto which other images or artwork may be added and subsequently manipulated by the embedded data of the image file.

FIG. 1 is a functional diagram showing the interaction of one embodiment of various components and modules. For example and without limitation, and as described subsequently, an image file generated according to FIG. 1 may be used inside an imaging application, including and referred to herein without limitation as ILLUSTRATOR®, on computer system 10, to place and distort an imported image according to the embedded surface data.

The modules indicated in FIG. 1 include a Creation Tool 101, a Content Management System, or CMS 102, a Server 103, Locally Cached Source Image Data 104, an Image Resizing/Rotating Module 105, an ILLUSTRATOR® Artboard 106, an Imaging Compositing Module 107, a GUI 108, and an ADS Module 109. Creation Tool 101 is used to produce a target image 100, which may be provided, through CMS 102 and Server 103, as high-resolution and/or low-resolution target images to Locally Cached Source Image Data 104, Locally Cached Source Image Data provides surface data, image data, and hinting data to Image Resizing/Rotating Module 105, Image Resizing/Rotating Module provides surface mesh data and image data to Imaging Compositing Module 107, Imaging Compositing Module provides artboard guidelines and changes to vector data to, and receives vector data from, ILLUSTRATOR® Artboard 106, and provides flat raster image data corresponding to user artwork file or artwork 110 to, and receives dimension settings and image settings from GUI 108. The components and modules of FIG. 1 may reside on one or more of computer systems 10 and 20.

In one embodiment, certain the components and modules of FIG. 1 are used to generate a target image 100, which a user may then access and place artwork 110. In certain embodiments, target image 100 is generated by a first person using certain modules of FIG. 1, and a second person generates artwork 110 in a design application, and then accesses the target image and operates certain other modules of FIG. 1 to form a composite image of the artwork on the target image.

In certain embodiments, components or modules of FIG. 1 are used to generate a target image 100 that includes, for example and without limitation, a target image scene or object, one or more layers intended for a user to place user artwork 110, multi-dimensional embedded surface data for distorting the artwork according to placement within the scene, and highlight/shading information, masking information, and additional visual effects that may affect how the user artwork appears in the scene of target image.

Various aspects of the invention may be better understood by way of illustrative examples. Embodiments and examples here described herein which include a target image 100 of a person walking across a street and holding a canvas shopping bag. Target image 100 is adapted to accept user artwork 110 that is distorted, according to multi-dimensional surface data within the target image 100, to appear as if it is on the shopping bag. It is understood that this is but one specific example of the use of various embodiments, and is not meant to limit the scope of the present invention.

In some embodiments, Creation Tool 101 is a stand-alone application which produces a target image 110 having an embedded image scene or object, multi-dimensional surface data for distorting artwork 110, highlight/shading information, masking information, and additional visual effects. In other embodiments, the Creation Tool 101 may be software which is integrated inside other imaging software such as PHOTOSHOP® or ILLUSTRATOR®. In certain embodiments, the Creation Tool 101 creates a layered image with embedded multi-dimensional surface data, such as 3-D data, using the methods described in U.S. patent application Ser. No. 11/615,216, published as U.S. Patent Publication Number 2007-0146389 A1 to Distler, which is co-owned and which is incorporated herein by reference and which is referred to as "the Distler application." Alternatively, the surface data is pseudo-3D (or "2.5D") surface data.

In certain embodiments, Creation Tool 101 may also embed additional information into the image. The additional information embedded into the image in Creation Tool 101 may be referenced in Image Resizing/Rotating Module 105, as described subsequently, to dynamically resize and/or rotate the surfaces contained inside the image scene or object. In certain embodiments, the additional embedded information may have been originally stored with or as a target image 100 with complete 3-D structural object data (such as complete 6 sided cube which accurately describes a cube as it might appear in a photographic image of a cube), partial 3-D hinting data (which solely indicates corner points of a cube in the previous example), edge information data (such as 3-D data which describes the silhouette of a 3-D object), background scene information (such as the background imagery which would revealed to the user should the size of the cube be made smaller).

Any and all references to "modules" in describing functionality are intended to create a mental image of separate or distinct functionality. The use of "modules" is not intended to describe a specific type of software design or behavior. In some embodiments, modules may be self contained code that runs either locally on the user's computer, remotely on a remote server, or both. In other embodiments, modules may be a description of functionality but this functionality may be an integral component in a single piece of software code that executes locally on the user's computer, remotely on a remote server, or both. In still other embodiments, the functionality of a module or modules may be indistinct from the functionality of other portions or the code but are described as distinct for the clarity of this document. In addition, any and all references to a "file" or "data" are interchangeable and only examples of formats used to move data between various modules or components.

GUI 108 is considered, for these purposes, to be a module and thus the underlying form should be considered independent from its functionality. GUI 108 may be displayed in a number of ways: for example: locally on the user's computer via stand-alone or plug-in software or remotely via a web browser.

In certain embodiments, the GUI 108 may be nearly unrecognizable as a GUI, where the functionality of each module will be as subsequently described, but where the user will not interact with a GUI directly. For example: the modules may collectively take the form of a stand-alone software application or applications which reside and function on a remote web server. In this case, the user is presented with a GUI that appears to the user as an html form. The form replicates both the functionality of the user's artboard (as in Illustrator Artboard 106) and GUI 108 together. Through the html form the user may upload their artwork 110, select a number of settings, and then preview the final scene or object image rendering. The process is less interactive but the user is still able to obtain the same or similar results to the more interactive experience as described in this document.

CMS 102 is typical of many web sites where specific users have access to web pages dedicated to the management of database items. In one embodiment, CMS 102 allows for the management of image resources as they are delivered by the Creation Tool 101. Administration users can use CMS 102 to select images built with Creation Tool 101 and make them available to image Server 103.

Figure 7:
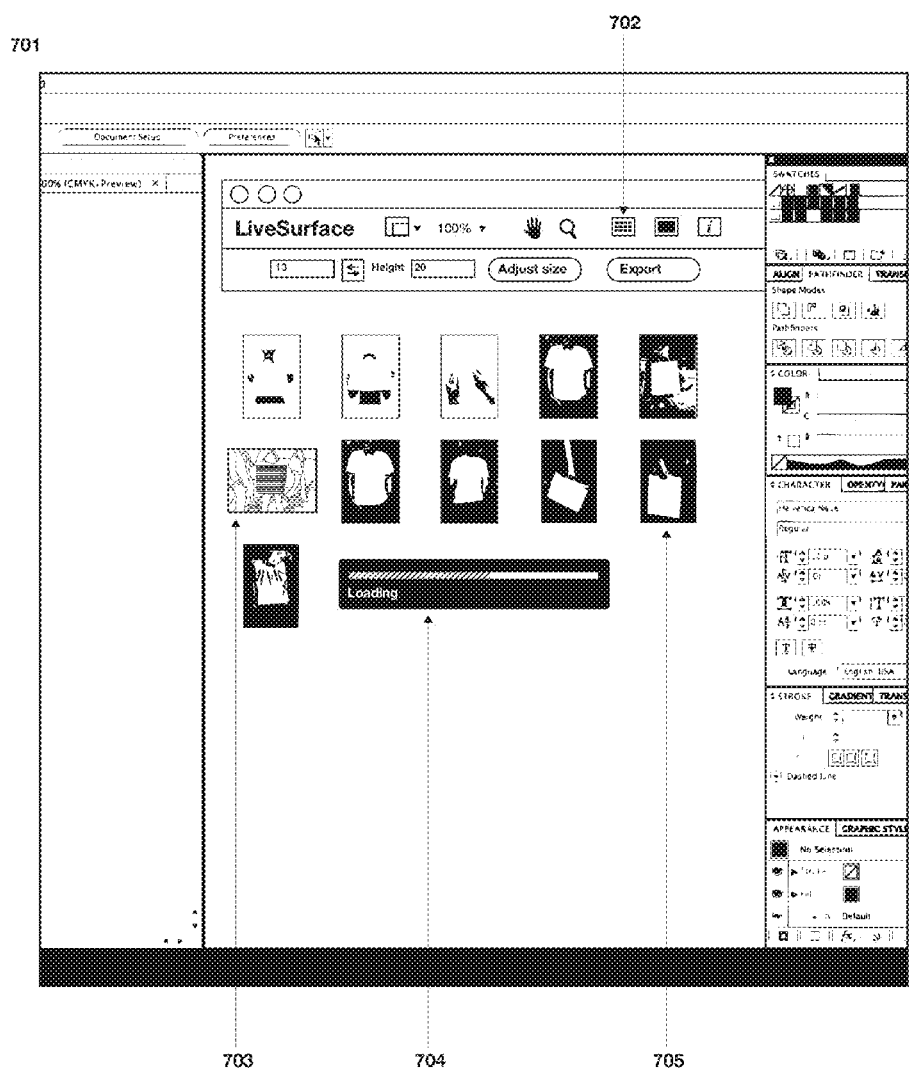
FIG. 7 is one embodiment of an interface showing the display of a library of images inside the user's design software.

Server 103 is, in some embodiments, a conventional Internet or web server, such as computer system 20, which delivers target image files 100 based on requests made by the software user interface file browser as depicted in FIG. 7, as described subsequently, and as represented in GUI 108 and more specifically as Image Selection data depicted in Block 108*a*. Low-resolution target images may be delivered based on requests by the user via the software user interface (as depicted in Block 103*a*). In some embodiments, billing and tracking information relevant to the request for target images 100 are authorized by Server 103 before delivery of imagery in order to control access to the imagery by the user (as depicted in Block 103*b*). In one embodiment, this is used to prevent piracy and to establish that the user has an active user account on the server, that their image subscription is valid, and that the image they are requesting is allowed to be downloaded as part of their current user billing account which is being tracked on the Server 103. Server 103 may also record user statistics (as depicted in Block 103*c*) for the purposes of future marketing or product development. In one embodiment, this is not delivered to the user; it is only accessible by authorized users via the CMS 102.

In some embodiments, after Server 103 has received the user request for a target image file 100, authorized the download of that file, and accessed the appropriate image resolution from computer storage, the target image file (either high-resolution or low-resolution depending on the situation) is stored as Locally Cached Source Image Data 104. The data may be stored, for example and without limitation, on computer system 10, which will store the image in local file cache in memory 11.

In some embodiments, Locally Cached Source Image Data 104 may include one or more layered data components such as those referred to as "Surface mesh/3D structure(s)" in Block 104*a*, "Effects, Shading/highlighting, Masking, Image Info" in Block 104*b*, and "2.5D hinting and scene/object 3D structure(s)" in Block 104*c*, which may be used with embedded pseudo-3D data. The Surface mesh data of Block 104*a* is, in some embodiments, a 3-D description of the surfaces in the image scene or object of target image 100 which will be used by the user to display artwork 110. In some embodiments, target image 100 may contain other imaging layers, such as effects data, shading/highlighting data, masking data, image data, and miscellaneous image information, as in Block 104*b*. In some embodiments, this miscellaneous information could be search module cues for locating the image.

In general, Image Resizing/Rotating Module 105 transforms the two-dimensional image of an object according to embedded data describing the multi-dimensional structure of the object to produce a new, two-dimensional representation of the object as the result of resizing, stretching, or rotating of the object. There are numerous methods and algorithms for affecting such changes in a two-dimensional image of an object, which include, but are not limited to conventional 2D techniques such as bicubic interpolation for scaling and resizing or traditional 3D techniques such as bump and texture mapping applied to a 3D structure.

In one embodiment, Image Resizing/Rotating Module 105 may accept multi-dimensional surface data, image data, and/or hinting data from Locally Cached Source Image Data 104. In some embodiments, the image may contain 2.5D hinting data, as depicted in Block 104c. This information may be used by the Image Resizing/Rotating rendering Module 105 to make alterations to the low-resolution or high-resolution target image 100 coming from Locally Cached Image Data 104 and/or the image Server 103 in order to take the target image and generate a layered scene or object image which is then handed off to the Image Compositing Module 107 to composite in artwork 110.

In some embodiments, the Image Resizing/Rotating Module 105 uses dimensioning/image information as numerically specified by the user via the user interface inside the locally running software user interface, as depicted in Block 108b. In other embodiments, the dimensioning/image information may be generated without the user's direct intervention or interaction but rather to suit the size of artwork 110 as depicted in ILLUSTRATOR®. Artboard 106 and Block 106a as ILLUSTRATOR® Artboard and ILLUSTRATOR® vector artwork, respectively, will thus select only images from Server 103 that support resizing to sizes appropriate for the size of the artwork at the time.

In other embodiments, Image Resizing/Rotating Module 105 allows the user to directly interact with the final composited image rendering via GUI 108. As depicted in FIG. 6, for example described subsequently, this can be done by dragging an outlined view of the scene or object surface in the software's user interface to the desired size or view angle in the same manner that this would be done if the user was utilizing CAD software to resize a three-dimensional surface created in CAD and therefore it is fairly intuitive to the user.

In yet other embodiments, dimensioning/image information is indirectly governed by interactions performed by the user, such as dragging guides in or out of the ILLUSTRATOR® Artboard (as depicted in Blocks 106 and 106a), while working on their artwork 110 by the Image Resizing/Rotating Module 105. As the guide positioning is modified, Image Resizing/Rotating Module 105 uses this information to make adjustments to the size of the scene or object image in near real-time. The adjustments are made using target image 100 to create the layered scene or object image before compositing of artwork 110 is done with the scene or object image in the Image Compositing Module 107, such that compositing is accomplished using a surface, or surfaces, of the correct dimension.

Once appropriate Image Resizing/Rotating is performed by Image Resizing/Rotating Module 105, image data and surface mesh data is provided to Image Compositing Module 107. In one embodiment, Image Compositing Module 107 checks artwork 110, which may be vector or raster artwork, including, but not limited to, the contents of the ILLUSTRATOR® Artboard, for the most current version of the artwork residing at a pre-determined location on the artboard. In some embodiments, this is a region enclosed by a vector shape with a specific object or ink color name which indicates to the compositing module where to look for artwork 110. In other embodiments, the compositing module may search the entire artboard area or it may utilize artwork 110 that is available on a pre-determined artwork layer or document name.

In some embodiments, the predetermined region may be stored inside the target image file which is read in by the Image Resizing/Rotating Module 105. When Image Resizing/Rotating Module 105 creates the scene or object image from the target image file it may pass on information about this region to Image Compositing Module 107, which will then place guides to define the region into the user's artboard.

In some embodiments, Image Compositing Module 107 maintains surveillance of the user's artboard and/or artwork 110 to determine when to update its output with current user artwork. In some embodiments, Image Compositing Module 107 will provide updated output when a change is sensed between the most recently included artwork 110 and the current artwork. In other embodiments, Image Compositing Module 107 may rely on a triggering message which will be generated by the user's working environment or the software that is being utilized by the user to create or alter their artwork 110. In some embodiments, this software may be Adobe ILLUSTRATOR®. In other embodiments, this may be another software package being either commercially available or complete bespoke for these purposes.

Figure 4:
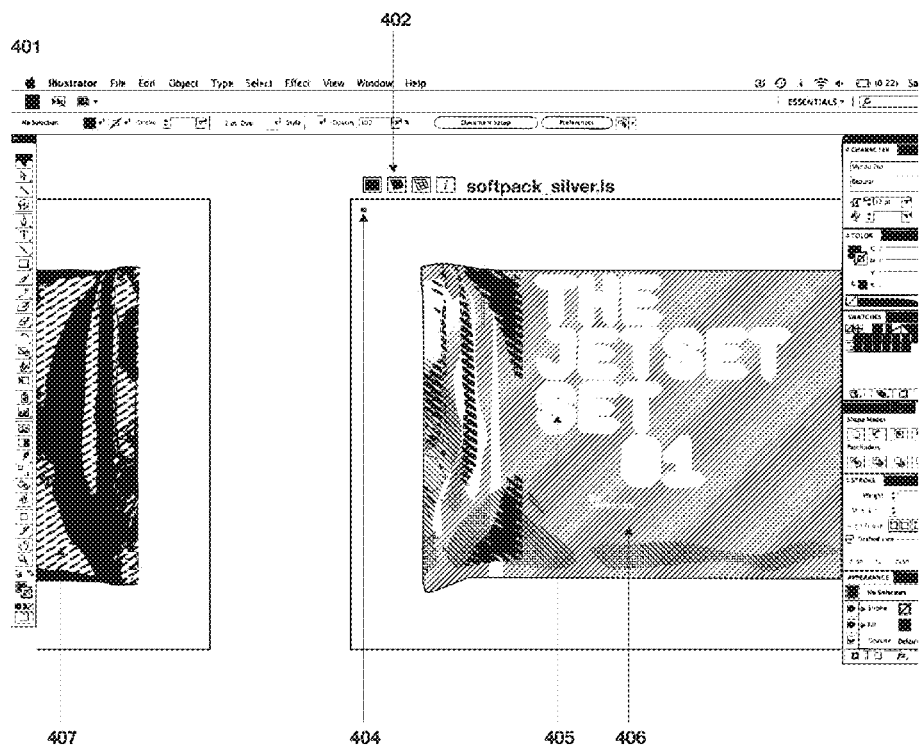
FIG. 4 is one embodiment of an interface which shows the combination of layered imagery and software functionality using the components of FIG. 1.

After Image Compositing Module 107 has completed compositing artwork 110 into the scene or object image, as further detailed in FIG. 2, in some embodiments the final result will be displayed inside the user interface of the software via a UI Display/Output module, or GUI 108, or as shown in FIG. 4. Specifically Display Module 108 represents information to display 15, where Block 108a provides for Image Selection, Block 108b provides for Dimension/Image Settings, and Block 108c provides for UI Display/Output.

In some embodiments, Image Compositing Module 107 provides GUI 108 with a flat raster image which is zoomable and dragable, just as with flat raster images displayed in other graphics applications. In other embodiments, the image displayed by GUI 108 may be a layered composite of vector and raster imagery, where the raster imagery is the image information as supplied by the server and the vector information is artwork 110, post-transformation. Keeping artwork 110 as vector information may provide to speed. Because artwork 110 will still reside in its original vector/raster format (as appropriate to the artwork itself) there will be non-destructive advantage or liability to converting the artwork to flat raster artwork during compositing or keeping it as vector art during compositing.

In other embodiments, the final result will be displayed as an image or object placed inside the original user artwork area, such as inside the ILLUSTRATOR® artboard area.

Figure 3:
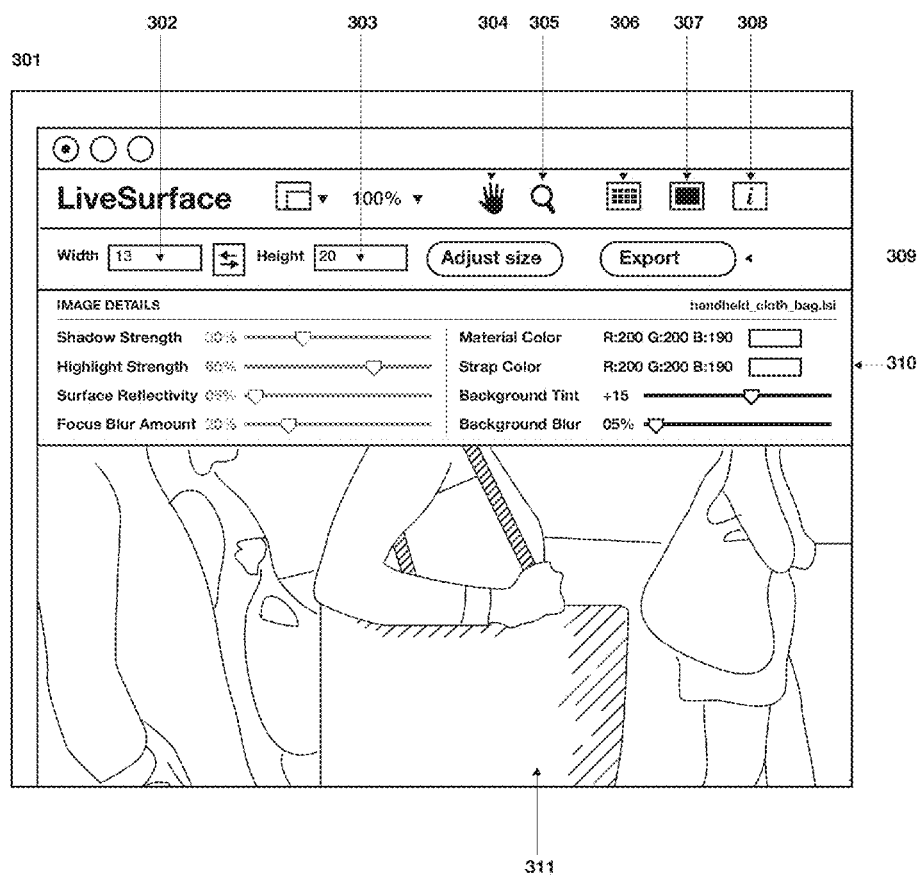
FIG. 3 is one embodiment of interface detail of FIG. 2.

In some embodiments, to provide controls to the user with which they may make adjustments to the final composite image (such as adjusting the amount of effects applied, the density of the shadow, the opacity of the user artwork, etc) controls shall be provided in a dedicated region of the user interface as described by FIG. 3. In other embodiments, these controls will be placed differently however, they will provide the user with fine controls over the final image attributes.

In yet another embodiment, image controls will be associated with a region of the artwork and/or the ILLUSTRATOR® Artboard area. In one embodiment, the controls will be accessible from within the context of the final composite image while it is rendered in place on or near the artwork, as opposed to another embodiment where the final composite image will be rendered to a region or window which is distinct from the user artwork region.

In some embodiments (as depicted in Block 108b) alterations to the size and/or rotation of the scene or object image surface may be made at any time during the process (regardless if artwork 110 is already shown in the final composite or the user has yet not created any artwork for the Image Compositing Module 107).

In some embodiments, the user may decide to render their final composite image using slower, but higher quality, versions of the scene or object imagery. In one embodiment, a high-resolution version of the current composite low-resolution image is requested from the user interface by clicking the "Export . . . " button as depicted as an icon 307. The export button make the request from the Server 103, the Server sends the high-resolution image to the Locally Cached Image Data 104, is adjusted by the Image Resizing/Rotating Module 105, composited with user artwork 110 (Block 106a) with the Image Compositing Module 107 and then either displayed in one embodiment or written to disk in another.

Ad server, or ADS 109 is a server that supplies advertising or printing resource information to GUI 108, where the information is related to the production of objects being designed. Thus, for example, if the target image is of a canvas bag, then ADS 109 may deliver contact information for services related to purchasing or printing on bags. If the target image is a billboard, then ADS 109 may deliver contact information for business related to the production and display of billboards.

In certain embodiments, the form or data structure of target image 100 is identical or similar throughout the modules or components of FIG. 1. In certain other embodiments, the form or data structure of target image 100 is modified in certain modules or components of FIG. 1. Thus, for example and without limitation, target image 100 may be accessed by Resizing/Rotating Module 105, in one form or data structure, as provided by Creation Tool 101, and Resizing/Rotating Module 105 converts the form or data structure of target image 100 into another form or data structure for use by the Image Compositing Module 107. This conversion may be provided for one of a number of reasons. Thus, for example and without limitation, target image 100 may include proprietary or confidential information that is to be withheld from the user, and which is removed by Resizing/Rotating Module 105. In another embodiment, target image 100 produced in Creation Tool 101 is of a format that is not readily used by the Image Compositing Module. Thus, for example and without limitation, Creation Tool 101 may produce target image 100, in a completely 3D native file format that is not useable by Image Compositing Module 105. In this embodiment, Resizing/Rotating Module 105 renders the 3D native surface data into a format compatible with the Image Compositing Module before passing the surface mesh data to the Image Compositing Module.

FIG. 2 illustrates an embodiment of the combination of layered imagery and software functionality using the components of FIG. 1, showing artwork 110 as composited in target image 110 and shown side-by-side in GUI 108.

FIG. 2 includes two examples of artwork 110 and a scene in a target image 100, which is for illustrative purposes and is not meant to limit the scope of the invention. Screenshot 201 shows a specific example of artwork 110 in region 202, and a composited image of the artwork on a target image in region 203. Screenshot 204 shows a specific example of a different artwork 110 in region 205, and a composited image of the artwork on a target image in region 206.

Screenshots 201 and 204 show typical design software user interface elements with the various software components illustrated in FIG. 1 running in conjunction with interface elements from another software application, in one embodiment those from Adobe ILLUSTRATOR® CS4, and displayed on display 15. Thus, for example and without limitation, the displays of screenshots 201 and 204 are generally similar to that provided by GUI 108.

Thus, for example, region 202 shows a planar representation of the artwork in a bounding area to be provided to a portion of a target image, and region 203 shows the planar artwork as it would appear when deformed to fit on an object within the target image. Bounding areas are described in more detail subsequently in the discussion of FIG. 12.

In one embodiment, some elements of the software components, or modules (such as GUI 108) are visible to the user as a graphical user interface or GUI (in one embodiment as a separate document windows which contain the images depicted in regions 203 and 206) while other elements are not visible to the user, such as CMS 102 or Image Resizing/Rotating Module 105. These modules create or affect data that in most cases eventually appears in the user interface but the modules themselves do not appear in the user interface.

Screenshots 201 and 204 are similar except that they show two different examples of artwork 110 (regions 202 and 205) and show how the artwork appears to be residing on the surface of a scene or object of a target image 100 (regions 203 and 206, respectively), which in this particular example is a canvas shopping bag being worn by a woman as she crosses the street.

An example of the completed low-resolution or high-resolution rendering of artwork 110 in place in the scene or object image is depicted in regions 203 and 206. Regions 203 and 206 differ in the same respective manner as regions 202 and 205 as they reflect the differences in the user artwork 110 depicted in regions 202 and 205.

One aspect of the side-by-side display of user artwork 110 and the artwork composited on the target image as depicted in FIG. 2 that is highly beneficial to the user is that once the user has placed the image window where they want it, they do not need to alter their working process in any way. The user can continue to create or alter any and all aspects of their design and will be able to visualize its appearance in context in near real-time so long as they keep the image window open and that their design work falls inside the region indicated by regions 202 and 205.

FIG. 3 is one embodiment of interface detail of FIG. 2 showing various controls including a surface dimension control/input area, tools for dragging and zooming, changing views, and adjusting image attributes such as shadow/highlight/blur and image color tint using the components of FIG. 1.

The GUI depicted in a screenshot 301 is a detail of the interface example depicted in FIG. 2 with the additional image detail controls displayed in region 311. In some embodiments, the logo and user controls for altering the dimensions of the surface(s) in the scene or object image (input areas 302 and 303) appear at the top of the GUI, above the scene or object image and below the window's title bar. In other embodiments, the controls depicted here may also appear in other areas of the user interface or even appear in other user interface windows.

An icon 304 and an icon 305 both depict user interface "tools" for changing the mode of how the user interacts with the image typically displayed inside the user interface window as in region 311. When icon 304 is clicked, all clicks and click-drag operations that come from the user when their cursor is over the image act to drag the viewing position of the image to a new location. When icon 305 is clicked, all clicks and click-drag operations that come from the user when their cursor is over the image act to change the zoom level of the image. Changes to both the viewing position and the zoom level of the image in one embodiment do not affect the viewing position or zoom level of artwork 110, as in regions 202 and 205.

In one embodiment, GUI elements, such as buttons, are provided which allow the user to change the current viewing mode of the window which, in one embodiment, currently houses the image of the shopping bag being worn by a woman crossing the street. An icon 306, when clicked by the user, puts the window into a mode where it retrieves a list of available images either from a locally stored library or from the image server as indicated by Locally Cached Source Image Data 104 and Server 103, respectively. This viewing mode will be discussed later but in one embodiment allows the user to browse a library of target images 100 which are displayed visually or as a list. The user can select an image from the library list and then double-click on the image thumbnail or name in the list to open it. The target image 100 will then be opened from the local library of stored images. But, before target image 100 is opened, the software will authorize itself against a locally stored authorization key or against an authorization key stored on the remote image server. The authorization key informs the software that the user is allowed access to the image they are opening for a number of reasons including anti-piracy measures, subscription enforcement/access and image use tracking Should the authorization key be shown to be invalid or expired, the user interface will present the user with a message and then block the user from accessing any further images. Images that are currently open will be shut down after giving the user the option to save their working state. Saving the working state will save only artwork 110 as well as necessary embedded associated image settings and preferences.

In some embodiments, these preferences may be stored within artwork 110 (which in one embodiment may be, without limitation, may be contained in an Adobe ILLUSTRATOR® CS4 .ai file). Preferences, will include the current surface dimensions, image file link info for the scene or object image being used to display the user artwork in context, and various image settings as selected in the Image Details interface (as depicted in region 310). Preferences and settings are, in one embodiment, stored inside the file containing artwork 110 because they are most conveniently associated with artwork 110 and storing the preferences and setting elsewhere would necessitate access to the information when it might not be available.

In some embodiments, multiple groups of preferences and settings may be stored inside the file containing artwork 110. In these embodiments, opening a file with multiple preferences and settings will elicit a user interface element (such as a pop-up window) that will ask the user to select which of the settings they would like to recall.

So long as access is authorized, recalling either one of a multiple or a singular preference/settings group upon opening an artwork 110 file will automatically attempt to load the respective target image from the locally stored cache of image or from the remote server if the image is not available locally. If saved dimensioning information is available, it will be used by Image Resizing/Rotating Module 105 to create or recreate the scene or object image surface(s) as soon as or before the context image is first displayed to the user. Unlike resizing that happens interactively when the user makes numeric or visual adjustments, in some embodiments this kind of resize-on-load activity will happen in the background and without the user's knowledge (except that in some embodiments the image may take slightly longer to load and/or a user interface element, such as a progress bar, may be displayed which informs the user that the image is being resized).

In some embodiments, depending on the prescribed level of security no further access will be granted to the image or other images after an invalidation has occurred and until this Blocked access has been overridden by re-entry of a correct activation code and/or re-activation at the Server level by a customer service administrator.

In other embodiments, a number of authorization failures will be allowed for (so as to prevent users being locked out due to authorization false negatives/failures). In still other embodiments, whether or not the authorization leads to a user being Blocked from accessing their desired image will depend on a formula derived from the number of access attempts in a given time period.

An icon 307 will display the rendered scene or object image. If the user has created user artwork 110 then it will be rendered into the appropriate surfaces of the scene or object image. In some embodiments, clicking this icon will also grant access to Image Detail preferences and settings.

An icon 308 will display additional information that is pertinent to the scene or object surface depicted in the scene or object image. In the example show in FIG. 3, clicking this icon would reveal manufacturing and sourcing details about the shopping bag.

In some embodiments, clicking a user interface 309, which reads "Export . . . " allows the user to save out a high-resolution copy of the scene or object image. In some embodiments, clicking Export . . . will first authorize then retrieve a high-resolution copy of the image from the remote Server, re-size, re-angle, and re-composite artwork 110 onto the surface of the image in high-resolution. Once the images are composited, the user will be provided with the option to save the final file as a high-resolution flat file to their local disk. In other embodiments, the high-resolution flat file contains some layered image elements and after saving to disk may be opened in a variety of compatible photo editing packages (such as Adobe PHOTOSHOP®) so that the user may customize aspects of the image that are not accessible via the Image Detail preferences/settings. In yet other embodiments, Export . . . may not yield a high-resolution file but will save the image as the user see it in a non-proprietary or not tied to authorization format to disk. In still other embodiments, Export . . . may save a layered version of the image to local disk but the image shall remain low-resolution. In some embodiments, requesting a high-resolution form of the image may not incur any user fees and may be part of the user's existing access plan or subscription. In other embodiments, the user may need to pay additional fees to access a high-resolution file or a layered file or both. In many embodiments, the user will be given a choice as to which of the above export method they would like to utilize after clicking the Export . . . button.

FIG. 4 is one embodiment of an interface which shows the combination of layered imagery and software functionality using the components of FIG. 1, in which user artwork 110 is displayed in context as a type of view, in-context with the artwork. Thus, for example and without limitation, the display of FIG. 4 is generally similar to that provided by GUI 108.

One embodiment of the user interface, as depicted in screenshot 401, incorporates the scene or object image into the same window as the artwork window or in one embodiment the user's artboard inside Adobe ILLUSTRATOR® CS4. There are both advantages and disadvantages to incorporating the context image into the artwork window. One advantage is that this provides an even more streamlined workflow to the user. Users of most commercial design applications are experienced with using different viewing modes (such as Keyline and Preview in Adobe ILLUSTRATOR®) to visualize their artwork 110 in the way that best suits the task they are performing at the time. In one embodiment, incorporating context imagery into the artwork window effectively adds one more viewing option to the user. The user can work in Keyline mode or Preview mode as they always have but in one embodiment can select Context or similar from their View menu to see their artwork 110 rendered into an image. As with the user interface illustrated in previously discussed figures, any and all changes made artwork 110 by the user are non-destructive un-doable as the have been before when using a commercial design application, including but not limited to, Adobe ILLUSTRATOR® CS4.

The advantages of having contextual viewing be available inside artwork 110 area also include less need for screen real estate due to having additional windows open and the ability to have multiple contextual images displaying multiple pieces of user artwork at the same time (as depicted by images 405 and 407).

In some embodiments of this approach, viewing modes can also be controlled by a set of icons that "travel" with the placement of the scene or object image in the artwork, as indicated by icons 402. Clicking icons 402 from left to right show artwork 110 flat (not composited to the context image), in perspective (composited to the context image), in keyline perspective (in perspective but showing only artwork 110 outlines/keylines and not composited), and additional information such as that in region 311: manufacturing and production details. In one embodiment, clicking the last icon 402 displays a pop-up window with a dieline artwork link and printer contact information for specialists that deal with silver softpack packaging as shown in the context image. Of note, information displayed here could either be retrieved from a local cache of information that is downloaded to the user's local drive when the image is retrieved or retrieved from a remote server.

Icon 404 indicates a user element that, in one embodiment, is a small square. As with the other user interface elements that are always positioned by the software at the upper left of the context image when it is placed or re-placed onto the user's artboard, this interface element would be positioned, and overlaid on the upper left corner of the context image. In one embodiment, clicking the small square element would open a floating window with additional context image details and options. This is further depicted in FIG. 5, as discussed subsequently.

A regions 405 and a regions 406 indicate user artwork 110 as they would appear in one embodiment, applied in perspective and composited to the scene or object image. In some embodiments, ink attributes can be specified by the user and associated with user artwork 110 on a granular or global level. In some embodiments, this would be done by using a special color naming convention (for example: red opaque or blue transparent). In other embodiments, this would be done by placing artwork 110 on specific artwork layers within the artwork window (for example: an "opaque" or "transparent" layer). In still other embodiments, user artwork 110 attributes could be set using pre-existing techniques already available within the design application with those settings being read and acted on by the Image Compositing Module 107 to affect how artwork 110 is rendered in the context image.

In one embodiment, these ink attributes inform the Image Compositing module how to render artwork 110 during the compositing process. In one embodiment, the ink attribute may be a reserved ink name, as discussed subsequently. In the example depicted in FIG. 4 both the type and the background (regions 405 and 406 respectively) are set to print opaque, simulating flexographic or silk-screen printing techniques closely. Alternatively, a region 407 shows a pattern that is set to print transparently as closely simulates the look of offset or gravure printing with transparent inks.

Figure 5:
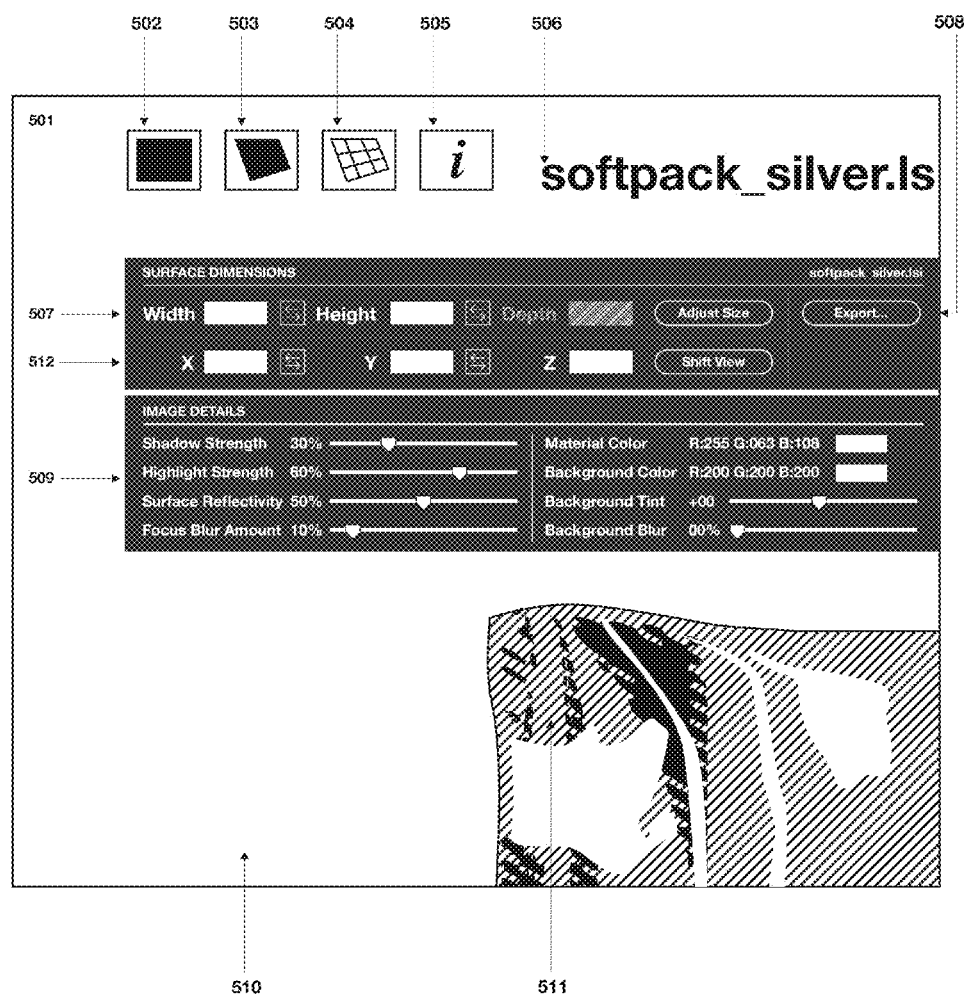
FIG. 5 is one embodiment of a detail of FIG. 4.

FIG. 5 is one embodiment of a detail of FIG. 4 which shows various controls, including a surface dimension control/input area, tools for dragging and zooming, changing views, and adjusting image attributes such as shadow/highlight/blur and image color tint.

Screenshot 501 is, in one embodiment, a detail of the user interface depicted in FIG. 4. As discussed above, in one embodiment, icons 502, 503, 504 and 505 allow the user to change the view that is displayed inside screenshot 501.

Label 506 depicts file naming text that, in some embodiments, is placed to the right of the icons and always associated in position with the context image. Displaying the name of the image has advantages to the user: it confirms to them which scene or object image they are working with and allows them to avoid having to compare multiple instances of images solely on the basis of visual traits.

In one embodiment, a region 507 depicts the region of a window which, in some embodiments, may be overlaid translucently on top of the respective scene or object image. In other embodiments, this may be a self-contained floating window. In still other embodiments, these settings may appear solely as part of the windowed environment as menu options.

In one embodiment, the user enters in the desired width, height, and depth information (depth is grayed out in this example to indicate that depth settings are not available) into the available text boxes in region 507 of the interface in order to change the dimensions of the respective scene or object image surface(s). By clicking the button labeled Adjust Size a request is sent to Image Resizing/Rotating Module 105, which will then recreate the scene or object image (in this example the silver softpack) to match the desired dimensions. In one embodiment, if the user leaves the dimensioning information blank they will, by default, include default dimensions, which in some embodiments are the dimensions of the physical surface when photographed or otherwise created.

In some embodiments, Image Resizing/Rotating Module 105 may utilize some of the techniques discussed in U.S. Pat. No. 7,477,800, hereby incorporated by reference, to aid in the creation of a component or all of the scene or object image without changing proportions on elements that must remain in their original size. In the example of a woman reading a magazine, the magazine surface dimensions must be resized without changing the size of the woman reading a magazine. Certain methods discussed in U.S. Pat. No. 7,477,800 aid in doing this by designating discrete image elements which should be resized and others which should not be resized.

In other embodiments, Image Resizing/Rotating Module 105 may use more traditional 3-D image generation or rendering techniques to make size changes to discrete image elements within the scene or object image. In these embodiments, the scene or object images would be constructed using methods that are compatible with traditional 3-D image generation. For example: a scene or object image may be layered using methods described in the Distler application, with additional 3-D information embedded to further describe the geometry of the image elements, going beyond describing surface elements of the image and describing background and foreground elements that may not accept artwork 110. For example: in the previously discussed example of a person reading a magazine, 3-D information that describes the person, the background, and how the magazine relates to those elements (it is held by the person's hands) would be embedded in the target image file 100. This 3-D information would then be accessed by Image Resizing/Rotating Module 105 as it creates each scene or object image element. The methods used to make adjustments in these embodiments are similar to those of more typical 3-D or CAD rendering software applications, using 3-D geometry and embedded raster or vector surface textures and imagery to create a 2-D rendering of 3-D scenes or objects. In this case, the final result of this rendering would be a layered image file with embedded 3-D data that is compatible with methods described in the Distler application while having additional embedded information for use by Image Compositing Module 107 as described below. The layered scene or object image rendering would, of course, be usable by the Image Compositing module.

In some embodiments, the target image file utilized by Image Resizing/Rotating Module 105 may include a number of components, including a mix of 2-D and 3-D elements including: textures/image for the surfaces onto which user artwork 110 will be applied, surface and effects masks, 3-D structures, shadow elements, background imagery, image specific preferences, serial numbers and artboard guides. For example: in the case of a person reading a magazine each scene component would be a separate element; the hands, magazine surface, person, background, shadow would each exist on a separate layer. 3-D structures that describe these elements may also be included within the target image file. To create the layered scene or object image, which is later used by Imaging Compositing Module 107, Image Resizing/Rotating Module 105 reassembles the various image elements using the 3-D structures to realistically alter dimension and viewing angle of both the surfaces as well as, in some embodiments, other image elements.

In some embodiments, Image Resizing/Rotating Module 105 has the task of not only altering the dimensions of discrete surfaces within the scene or object image as a response to user interaction/request, or internal requests made by other modules in response to pre-determines settings or preferences, but also has the task of making adjustments to the apparent viewing angle or position of items in the scene or object image. As with changes to dimension, viewing angle or position changes may be done using a number of techniques. For example: the manipulation of 2-D (x, y) dimensions in order to create an illusion of viewing angle change (for example: one face of a cube object may be made more narrow while another is made more wide) or the manipulation of the embedded 3-D surfaces within the scene or object image and their associated raster or vector surface images or textures. For example: an image of a cube has embedded in it a 3-D structure of the cube as well as an image for each of its visible faces, shadow and background—Image Resizing/Rotating Module 105 reads in the 3-D structure data at the new viewing angle and then renders a new complete cube image, which contains appropriate layers and appropriate embedded data, by using the 3-D structure in combination with the other embedded elements.

As with alterations to dimensions done based on user interactions with the GUI 108, alterations to apparent viewing angle or position can also be made by the user by entering numeric changes to the x, y and z position of the "camera" (or angle from which the scene or object is viewed). In one embodiment, this numeric information may be entered by the user in a region 512. In other embodiments or the same embodiments, the user may also make angle changes by click-dragging a GUI element that overlays the final scene or object rendering. The visual dragging interaction described here is typical of many 3-D or CAD applications (for example: a sphere with x, y and z axes delineated overlays a low-resolution preview rendering of the scene or object image and the user click-drags the surface of the sphere to change the apparent viewing angle or position).

As previously stated in relation to interface 309, an Export . . . button 508, when clicked, will allow the user to export a version of the image being displayed with or without the user artwork 110 applied. In some embodiments, this exported image may be of higher or lower resolution, of more or less layers, or of different file properties all together (for example: a conversion to vector artwork for both the image and the scene or object image). The Export . . . button may provide access to numerous export options (which may be supplied dynamically to the user interface from a remote Server or a locally store collection) or just one.

The Image Detail preferences/settings indicated in region 509 are, in one embodiment, a series of settings that allow the user to have an immediate and direct effect upon the scene or object image's appearance without having to make image retouching type adjustments, which disrupt workflow and require a higher level of technical skill. As far as the user is concerned, clicking the palette associated with Material Color and picking a color using the operating system or design application color picker to change the color of the surface (in this example the silver softpack package) is a simple two-step process.

Adjustments made to preferences/settings invoke actions within Image Compositing Module 107. Adjustments to Shadow and Highlight Strength adjust the opacities of the shadow and highlight layers inside the proprietary image format which is, in one embodiment, referred to as .lsi (or "LiveSurface Image"). To keep certain property sliders (or percentage) adjustments from being adjustable in a way that can make images look poor, each associated layer has with it a look-up table. Using the example of the silver softpack package, a user may set the highlights to only range from 0% opacity to 50%, where a highlight greater than 50% would appear unrealistic or might reveal defects in the highlight artwork 110. Thus when the look-up table associated with the highlight layer includes two numbers: 0 and 50. Image Compositing Module 107 utilizes these values to scale setting by equating a value of 0% on the slider/percentage setting to 0% opacity and a value of 100% on the slider/percentage setting to 50% opacity. Thus, for example, a 50% setting of the slider/percentage settings sets the opacity to 25%. This provides consistent results for the user: 0 to 100% selection always provides the same effect regardless of the scene or object image.

In one embodiment, also as part of region 509 are examples of other adjustment attributes such as Surface Reflectivity and Focus Blur Amount. These attributes are used here to provide examples of two types of preference/settings that go beyond use of opacity to actually use rendering aspects of Image Compositing Module 107 to enrich the realism of the scene or object image displayed to the user.

In one embodiment, Surface Reflectivity uses a reflection map (such as an image of the surface's environment as seen from the surface's point of view) to create a reflective look. In some embodiments, certain artwork 110 may be set to react or accept the reflective look rendered by Image Compositing Module 107. For example, a piece of user created type might have its ink attributes set to metallic. In this example, if the Surface Reflectivity setting is a large percentage then objects such as the type will begin to visually display parts of the reflection map and the type may show parts of a horizon line or a scene which endows the type with a realistic looking metallic material. In some embodiments, the reflections are stylized (something like chrome reflections) while in other embodiments they are realistic (something like a reflection that appears in the window of a storefront).

In other embodiments, other surface and/or print simulation options may be displayed in the place of Surface Reflectivity or in addition to it. In the same way as discussed above that a piece of vector art may be named with a specific object or ink color name or placed on a pre-determined artwork 110 layer or document name to indicate to the compositing module where to look for the artwork, naming or layer placement may be used to designate that a piece of user artwork should receive special rendering treatment from Image Compositing Module 107. For example: a piece of user artwork 110 may be named or filled with ink colors that are named "emboss" or "letterpress" to designate to Image Compositing Module 107 that it should a number of techniques when it renders the user artwork 110 to make the artwork appear to be embossed or printed using letterpress when it is composited into the scene or object image. In this example, sliders for a variety of emboss or letterpress attributes would appear in the Image Detail options. To do this, the GUI or software that finally displays and presents the final composited rendering to the user (for example: GUI 108) first reads which customizable settings should be displayed in the Image Details from the scene or object image embedded data via Image Compositing Module 107 or directly from the scene or object image file. Once the basic scene or object image set of parameters (such as shadow and highlight intensity) has been established, additional parameters are read in from artwork 110 either directly or via the Image Compositing module. For example: if the user selects a "embossed" (as in the example above) as an attribute of a component of their artwork 110 then this is recognized by Imaging Compositing Module 107 and communicated to the GUI so that the GUI will display the appropriate options when Image Details are called up by the user.

In still other embodiments, the range of user adjustable image elements may be expanded by allowing rendering that cannot be accomplished by Image Compositing Module 107 to be accomplished by Image Resizing/Rotating Module 105. For example, discrete attributes that are 3-D in nature such as the roughness or smoothness of a surface may fall into this category. As before, the availability of control of these attributes will be governed by whether or not the availability of this attribute is marked or embedded in the scene or object image or whether or not the attribute itself is marked or embedded in the scene or object image.

To ensure that the user is assigning attributes that will be recognized by Image Compositing Module 107, a number of techniques may be used. In one embodiment, a shared database of attributes and their associated effects (in other words, how Image Compositing Module 107 treats the effect during rendering) would be used by both the software in which the user in creating their artwork 110 (in some embodiments Adobe ILLUSTRATOR®) and by GUI 108 which displays the final rendered image and the Image Details settings.

Various embodiments may contain a multitude of other scene or object image driven user-customizable Image Details as well as a multitude of user artwork 110 driven user-customizable Image Details. For example: blind emboss (as discussed in the example above); flat metallic ink; gloss or matte varnish and foils; die cut areas; windowed area; transparent ink; or opaque ink.

Focus Blur Amount, in this example, controls how much optical blur effect or focal plane falloff is applied to a surface. In some embodiments, this control may be displayed as a percentage. In other embodiments, this control may be displayed as a measurement of focal length (such as millimeters or inches). This preference/setting works in conjunction with a depth of field map that is either created as part of the photographic process or as part of the post photographic retouching and image development/delivery process. Based on the user's preference/setting, as selected in the Image Details panel (region 509), Image Compositing Module 107 may apply more or less blur to the user artwork 110 and, in some embodiments, more or less blur to the surface(s) in the scene or object image and the surrounding image background and/or scene. The rendering of blurring is done through any one of a number of understood approaches for creating a lens blur effect (for example: techniques used by Adobe in PHOTOSHOP® or Apple in Core Image routines).

Material Color, in this example, affects the color of the surface(s) in the scene or object image that is used to accept artwork 110. In some embodiments, the material color may be a solid (such as is true with the softpack packaging example identified by region 511), in other embodiments, the material color make be referred to solely as material and may have a selectable drop-down style menu with various prebuilt material layers. For example: the user might select "recycled paper" or "silver mylar" when working with the softpack packaging displayed in FIG. 5. In one embodiment, doing so would make a pre-rendered (pre-shaded and wrapped in 3-D space) material layer appear. The appearance of the material layer would affect not only the look of the final rendering but also the artwork 110 that "prints" over it on the surface of, in this example, the softpack package. Shadow and highlight settings, in some embodiments, may also be readjusted with the selection of a new material type (as shadow and highlights would very well appear different depending on the material type). Furthermore, artwork 110 with transparent ink attributes would print a bit more lightly (as it appears to soak into the recycled paper more than it would the silver mylar) and surface details such as reflectivity would also readjust.

Background Color simply allows the user to choose something other than the default (in many cases this is white). Depending on the image used, some background colors may be affected by existing background surface shading (such as in this example, as identified by region 510) and/or texture while others may appear as a pure, solid color. An option is also provided to the user where the background can be set to transparent. In embodiments such as this one, where the context image is incorporated into the artwork 110 window or artboard 106, user created imagery or artwork 110 placed behind the image when it has a transparent background will be revealed and will in many cases, such as our softpack packaging example, appear to lay behind the surface.

Background Tint and Background Blur exist so that the user can easily make adjustments to the portions of the imagery that are not part of the user artwork 110 accepting surface. For example, in regions 203 and 206, the street scene and woman crossing could be tinted or blurred for a number of stylistic purposes (one of which being to isolate the shopping bag from its environment in order to call more attention to it).

The effects in region 509 are just one embodiment of any number of embodiments of vector or raster image transformations that can appear and be modified or adjusted by the user in this panel. They are shown in order to represent the limitless number of effects that can be included or associated with any of the scene or object images.

In some embodiments, Image Compositing Module 107 performs automatic adjustments (without direct user interaction) to the preferences/settings based on a pre-determined set of criteria that is stored either locally on the user's computer or remotely on a remote server. The criteria may, for example, be rules that govern the module's compositing behavior based on the overall color density of artwork 110. In this example, artwork 110 is incorporated into a scene image which depicts a closely cropped shot of hands holding a poster. When artwork 110 is predominantly dark, Image Compositing Module 107 may increase the shadow strength and decrease the highlight strength of the lighting on the hands in the scene using any number of methods (such as manipulation of individual layers in the scene image file or levels controls). When artwork 110 is predominantly light the opposite action is automatically taken by Image Compositing Module 107 (shadow strength decreased and highlight strength increased). Despite the fact that the actions taken by Image Compositing Module 107 are automatic, the changes are reflected in the Image Detail preferences/settings and can be overridden by the user. In some embodiments, the user would also have the option to switch the automatic adjustments on and off via the GUI such as via the Image Detail preferences/settings.

FIG. 6 is one embodiment of the modules and components of FIG. 1 illustrating the resizing of images, such as target image 100 and artwork 110. Thus, for example, FIG. 6 illustrates an example of altering the dimensions of both artwork 110 area and the corresponding surface in target image 100. Thus, for example and without limitation, the images provided in FIG. 6 are generally similar to that provided by GUI 108 on display 15.

As discussed above, target image 100 is prepared for resizing in Creation Tool 101. Thus, for example and without limitation, a person creating a target image using Creation Tool 101 creates and assigns the appropriate multi-dimensional (such as 2.5D or 3-D) surfaces for one or more objects or image regions to be resized. The process of creating these surfaces may, in one embodiment, be completely manual, where the author must draw and/or enter x-y-z spatial coordinate points in sequence to build a 3-D object which conforms to the region of the image designated to receive artwork 110. In other embodiments, the process for creating these surfaces may be more automated though the use of edge detection algorithms and algorithms to determine surface vectors (such as the Sift algorithm). Regardless of the process for building the 3-D surfaces which will, in some embodiments, be embedded in target image 100, one of the important benefits for having 3-D surfaces associated with the region designated to accept artwork 110 in target image 100 is that the 3-D surface provides instructions to Image Compositing Module 107 on how to resize the target regions.

In one embodiment, each surface to be resized is isolated, so that the distortion of surrounding image elements can be reduced during the resizing of a target region within the image. One method for isolating the surface is to place it on its own layer so that it floats above the scene data. For example, in the case of the photograph of the image wearing a shopping bag while crossing the street, in FIG. 2, the shopping bag and straps would be isolated by the image's author onto their own separate layers.

FIG. 6 depicts a "before" screenshot 601 and an "after" screenshot 604, indicating images before and after user interaction with GUI 108 to alter the dimensions of a surface. Specifically, the before screenshot 601 includes an area 602 for placing artwork 110 and a composited target 100 and artwork area 603. In after screenshot 604, the areas have been stretched by a user, where area 602 has been deformed into an area 605 and the resulting composited target and artwork has been deformed from area 605 to that shown in area 606. The "before" appearance (screenshot 601) of both artwork 110 area or artboard and the surface in the context image can be seen to change visually as well as in measurable dimension after user interaction. Because the user could have either decided to make the shopping bag dimension more wide and shallow or more narrow and tall it is unimportant whether the before image is screenshots 601 or 604; what is worth noting is that the dimensions of both the artboard and surface in the context image have changed after user interaction.

In one embodiment, the user interaction necessary to alter the dimensions of the surface and artboard would be the entry of new dimensions into the width and height fields as further indicated in input areas 302 and 303 or in another embodiment in region 507.

In another embodiment, the user may select the surface visually, by clicking on it in the scene or object image. The surface would then be highlighted visually using a number of interface devices: for example, a colored outline to silhouette the surface form, a visible box to reveal the flat dimensions of the surface or a 3-D representation of the surface floated above the image. In all cases, as well as examples not listed here, the user would be able to set a new size by either: performing a click-drag operation to drag the edge or corner of the surface selection and/or by first selecting the surface with a click and then entering new dimensions numerically into the width, height, depth fields as previously discussed. Click-selecting the surface before click-dragging new dimensions has the advantage of making resizing of multiple surfaces in one image more clear/understandable to the user, even if the user decides to make the actual dimension adjustments by entering numeric data into the text fields.

Changes made to the dimensions of the surface(s) by the user via the user interface are then passed on to first Image Resizing/Rotating Module 105 which, in some embodiments may use a combination of 3-D surface data, resizing hinting/structural data, and image data as provided by Locally Cached Source Image Data 104. Examples of 3-D surface data include but are not limited to the same 3-D mesh used to distort artwork 110 when it is applied to the surface via Image Compositing Module 107. Examples of resizing hinting/structural data include, but are not limited to a second, simplified 3-D structure which instructs Image Resizing/Rotating Module 105 as to which parts of the surface to compress/expand and which to maintain. Thus, for example, the shopping bag the mesh may, in one embodiment, have a wireframe structure along the edges to signal that they should not be compressed/expanded during a re-dimensioning action while a second structure, in one embodiment, may have a wireframe structure along the interior portion of a surface to signal that this part of the image may be compressed/expanded during a re-dimensioning action. Examples of image data include, but are not limited to, background imagery that is revealed when a surface is made smaller within a scene or object image such as the shopping bag image depicted in FIG. 6.

In some embodiments, this information may be embedded within the scene or object image file that is stored locally on the computer's hard drive or store on a remote Server 20. In other embodiments, this information may be stored as distinct files but may be associated in a number of ways. Thus, for example and without limitation, the information may be stored by file naming or numbering structure, storage in the same file folder, or via a reference or look-up file which contains information referencing each of the separate files and is used by Image Resizing/Rotating Module 105 to locate the relevant files.

One restriction to resizing may result if Creation Tool 101 has only a single image to build target image 100, since there is likely to be very little or no scene information available in the image to indicate what is behind an object to be resized once it has been extracted and placed on its own layer. Because of this, when the object, such as the shopping bag, for example, is to be resized it will only be possible to enlarge it, and not reduce it (without exposing blank scene data). There are a number of solutions to this problem.

In one embodiment, Creation Tool 101 is provided with more than one photograph of the same object to produce target image 100. In this way target image 100 author can use two or more images to make a composite image which contains both the object to be modified and a complete scene behind the object.

In another embodiment, scene information is created within Creation Tool 101 of the occluded scene behind the object to be modified by those techniques common in the art, such as such as painting or cloning in scene information manually, or by using underpainting algorithms.

In general, bounding areas (such as area 1204A, as discussed with reference to FIG. 12) and/or sub-bounding areas (such as areas 1204B of FIG. 12) may be also associated to each 3-D surface. The association is done, in some embodiments, through the use of a GUI in which the bounding areas are displayed onscreen and the image author visually drags a connection from the flat bounding area to the 3-D surface. In addition to making associations or connections between bounding (or sub-bounding) areas and 3-D surfaces, the image author, in some embodiments, also augments the image region's 3-D surface by providing a region silhouette, anchor points, corner points, surface edge points, hinge points and surface flex points.

These 3-D points are integral in describing the 3-D surface and each group of points is used to dictate how surfaces are resized by Image Compositing Module 107, or in some embodiments another module dedicated solely to the resizing of target images and or artwork 110 targeted regions within images.

The process of resizing is best explored by providing a specific example. In the example of the shopping bag, the bag has a default size of 11×13 inches when it opens inside target image 100. The user of target image 100 (a designer) may wish for the bag to fit their design, which is 11×17 inches. So, in one embodiment, they make some interactions with the GUI to indicate that they wish to resize the 11×13 inch bag to an 11×17 inch bag.

The first step in the resizing may be for Image Resizing/Rotating Module 105 to identify which 3-D surface and target region is to be resized.

In one embodiment, Image Resizing/Rotating Module 105 uses simple flat bicubic interpolation, such as would be done if the bag surface region and bag shading/highlighting layers were selected in a raster imaging application, and stretched to be 17" high, then the shape of the bag would be distorted: the horizontal edges of the bag would be stretched and exaggerated so that the structure of the bag would lose its realism. In addition, the photographic texture and shading/lighting of the surface would be degraded.

In one embodiment, the resizing of the 3-D embedded surfaces within the image relies on raster image resizing. This solves the problem of too much distortion to some parts of the raster image or too little distortion in others, and provides for better matching of the newly distorted region or region in combination with image subject matter to the context and perspective of the scene. It also solves the problem of describing how to distort regions with more complexity than a flat surface (for example, a cube). This type of interpolation stretches the center more than the edges, giving a more realistic look to the deformed image.

Once the 3-D surface data has been embedded in the image, and associated with the region or regions assigned to accept artwork 110, the image author uses a number of techniques to further describe the 3-D surface data so that resizing is possible. In one embodiment some of those techniques are the addition of a region silhouette, anchor points, corner points, surface edge points, hinge points and surface flex points to the 3-D surface.

Region silhouettes act to define the silhouette or silhouettes of regions within target image 100 that are designated to receive user artwork 110. In some embodiments, the region silhouettes may take the form of Bezier paths which run around the edge of the object or scene within the image which has been designated to receive. In other embodiments the regions silhouettes may take the form of alpha channel masks which follow the edge of the object or scene within the image which has been designated to receive. The region silhouette or silhouettes are the foundation for the points that follow because they define the edges of the surface region or the edge of the object or scene within the image which has been designated to receive. The region silhouette effectively separates the region designated to receive user artwork 110 from its background.

Anchor points act to anchor any alterations to the 3-D surface data by the user. For example: in the case of the shopping bag, if the user wishes to enlarge the vertical dimensions of the bag and uses, in one embodiment, a GUI tool to visually stretch the bag to be taller or, in another embodiment, enters the new dimensions numerically then limits have to be in place which constrain the top edge of the bag from moving upward and cause the bottom edge to be the edge that changes. Anchor points serve this purpose: when the image author places an anchor point or anchor points along the top edge of the bag they freeze the top edge within its position in the image.

Corner points may be set in Creation Tool 101 to, in some embodiments, to define how artwork 110 coming from the bounding and sub-bounds areas is handled by Image Compositing Module 107. To position the cropped and rendered artwork 110 onto each respective 3-D surface the Image Compositing Module 107 requires the orientation and exact position. The corner points are used by Image Compositing Module 107 to position each respective cropped and rendered artwork 110 so that the corners of artwork 110 match the corners that have been added to the surface by the image author. The corner points are, as their name suggests, usually placed in the four corners of each face of each region. On the shopping bag example (where corners may not be entirely clear) the image author places the corner points at the edge of the image and in the best approximation for the corners of the bag. In terms of resizing, the corner points serve another very important function: they delineate where the top, bottom, left and right edges begin and end and connect (at the corner points). This is important because this tells the resizing module which edge, or axes, to extend and which to maintain.

Surface edges are used to further define what elements of the 3-D surface are edges. For example, if the region being created or edited by the image author in Creation Tool 101 is a cube, and the region silhouette is known, then further clarification will be needed by the both Image Compositing Module 107 and Image Resizing/Rotating Module 105. In some embodiments the image author can add surface edges to the 3-D surface using a GUI tool. The surface edges can be set to have corner radii and those radii adjusted to match the photographic surface (for example: a cube with a rounded edge would have surface edge lines that have rounded radii. Surface edges are used by Image Compositing Module 107 to apply artwork 110 to the surface. They also inform Image Resizing/Rotating Module 105 how to resize the surface because like other points in one embodiment they indicate which axes to extend or contract during the resize event.

Hinge points are used to further define what elements of the 3-D surface are hinged edges. For example, if the region being created or edited by the image author in Creation Tool 101 is a greeting card, and the region silhouette is know, then further clarification will be needed by both Imaging Compositing Module 107 and Image Resizing/Rotating Module 105. In some embodiments the image author can add hinge points to the 3-D surface using a GUI tool. The hinge points would be, in the example of the greeting card, added at the seam of the greeting card image to indicate to the Image Compositing module that 3-D surfaces used are folded at the point of the hinge points. The hinge points may be used by Image Resizing/Rotating Module 105 to determine if a surface may fold at the hinge point or points when the surface is resized. For example: hinge points along the concave folded edge of the greeting card would allow the card to be folded along the edge with hinge points on it. Image Resizing/Rotating Module 105, in some embodiments, may be automatically triggered to fold the card along the edge as a complement to resizing artwork 110 regions or 3-D surfaces of the card.

Surface flex points are similar to hinge points in both use by the image author in Creation Tool 101 and in the interpretation by Image Compositing Module 107 and Image Resizing/Rotating Module 105, except that they are used on the interior of a surface and not just a surface edge. They indicate that a surface may be flexed at the point when the 3-D surface is resized by the user. For example, if the region being created or edited by the image author is a t-shirt, and the t-shirt is being resized to make it vertically smaller, then the Resizing module will know that the surface of the 3-D surface that is embedded in the t-shirt image may flex (visually this would look similar to wrinkling) as the shirt is scaled down.

Spines and are author-created axes that are used by the image author in Creation Tool 101 to further define what elements of the 3-D surface for Image Resizing/Rotating Module of 105. The splines may describe the interior structure of a region instead of the 3-D surface of the region. Spines indicate to Image Resizing/Rotating Module 105 exactly how to collapse or expand the 3-D surface of the region or regions, using well-known techniques. For example: if the region being created or edited by the image author is a cube, and the region silhouette is known, then the addition of 3 spines, each a line, with 2 end-points, placed at the center of the cube where, in some embodiments, the end points are each attached to opposing faces of the cube, are used by Image Resizing/Rotating Module 105 to resize the cube. If, for example, the user wishes to make the cube taller and deeper then Image Resizing/Rotating Module 105 will be able to calculate the new 3-D cube surfaces be extending the y-axis and z-axis spines.

Scaling limits are restrictions that may, in some embodiments, be placed by target image 100 creator onto any combination of the above paths, points, surfaces or spines. The scaling limits are, in some embodiments, set by the image author using a GUI tool to place the maximum and minimum sizes for each region surface. This can, in some embodiments, be done by positioning the appropriate elements at a minimum position, indicating to target image 100 using Creation Tool 101 to record the minimum position (for example: with a button marked "minimum" in the authoring tool's GUI), and then repositioning the appropriate elements at a maximum position and indicating to the image authoring tool that it should record the maximum position (for example: with a button marked "minimum" in the authoring tool's GUI). In other embodiments, scaling limits may be entered to indicate the maximum dimensions of each region surface while minimums are assumed to be the default size. In this case, the process for adding a maximum dimension may be as simple as the image author selecting the region the wish to add a maximum dimension to and then entering width, height and/or depth information into a dialog box.

Once the image author has used the preceding tools and techniques to add data to Image Resizing/Rotating Module 105 either the embedded information in target image 100 or, in another embodiment, a related storage location, Image Resizing/Rotating Module 105 will be able to respond to a user request to resize the region, 3-D surface and appropriate image elements.

In a simple form of target image 100, where only the region silhouette, 3-D surface and corner point data are present (without any additional point or edge data), Image Resizing/Rotating Module 105 will use the 3-D surface data and corner point data to asses how the 3-D surface data should be resized. In some embodiments the image's user could assist the Resizing module by selecting the edges to be resized through a GUI tool (such as selecting the left and right edges of the shopping bag example before entering the new dimension). This will indicate to the Resizing module that these edges should be altered and all other 3-D surface data would be modified around this change.

When Image Resizing/Rotating Module 105 makes alterations to the dimensions of the regions and 3-D surfaces in target image 100, one critical function, in some embodiments, will be for the Image Resizing/Rotating module to act to "extend" elements along a specific axis, rather than acting to "stretch" the elements. The difference here is that Image Resizing/Rotating Module 105 may attempt to fill in data in the center while leaving the endpoint areas close to their original form. With the example of the shopping bag the Resizing module would extend the middle part of the bag while leaving the top and bottom parts of the bag intact. This will, in most cases, create a more realistic final result.

In certain embodiments, Image Resizing/Rotating Module 105 resizes the 3-D surface data to accurately represent the new dimensions requested by the user and also resizes the other associated x-y-z data points for the above data, 3-D structures for surfaces or interior forms, Bezier paths for object edges, alpha channel masks and any embedded layers, such as shadow and highlight layers.

In certain embodiments, Image Resizing/Rotating Module 105 repositions and interpolates or extrapolates pixel raster data from the original scene that intersects or overlaps the 3-D surface being resized. Interior pixel data will be extrapolated or interpolated using, in one embodiment, a variation on the Contextual Resizing invention. In another embodiment Image Resizing/Rotating Module 105 will extrapolate or interpolate this data using imprinting or pattern replication techniques. In still another embodiment a modified bicubic method could be used, where the bicubic interpolation would be focused by the Image Resizing/Rotating Module 105 on specific portions of the pixel raster data. All pixel information that overlays the 3-D surfaces being resized will be treated as pixel information that is mapped to the surface(s). This means that distortion of the pixel, or raster, information will happen in perspective and will, therefore, continue to appear as a realistic, flawless final image when user artwork 110 is applied.

Using the previously mentioned resources to evaluate the method with which to make the requested dimension alterations to the surface(s) and scene or object image, Image Resizing/Rotating Module 105 then performs image adjustments to, in some embodiments all of the layers of the image and in other embodiments to a sub-group of the layers of the image. In most cases, adjustments to the image would always be done to an original image and not to a previously adjusted image; this is to avoid compounding degradation that might happen during the adjustment process. As before, the original image may, in some embodiments, be stored locally and retrieved locally or it may be store on a remote server and retrieved remotely.

Alterations to the scene or object image and artwork 110 area or artboard may, in some embodiments, alter the guidelines drawn on the artboard to visually depict the dimensions of the respective surface. However, in most embodiments artwork 110 is undisturbed. In some embodiments, artwork 110 on the artboard may be automatically adjusted to follow the new surface dimensions. This is, however, only done at the request of the user via the graphical user interface (for example: as a checkbox preference to "resize artwork automatically for new surface dimensions").

After Image Resizing/Rotating Module 105 has made its necessary adjustments, the adjusted data is then passed on to Image Compositing Module 107, which uses the image layers and embedded 3-D surfacing data to distort the user artwork 110 and apply it to the surface(s) in the scene or object image.

Once distortion and compositing of the user artwork 110 and the scene or object image are complete the final rendered image is once again displayed in the graphical user interface. The user then has the option to adjust their artwork to suit the new surface(s) dimensions or to continue to make adjustments to the surface(s) dimensions.

FIG. 7 is one embodiment of an interface, such as GUI 108, showing the display of a library of images inside the user's design software, providing an extremely convenient method for viewing their artwork 110 in context.

Screenshot 701 is one embodiment of a library browsing interface which may be presented on display 15, showing that when the interface element button 702 is clicked by the user, a scrollable array of image thumbnails is displayed inside the same window that is used to display the scene or object image with user artwork 110 applied to its surface(s). In other embodiments, the image library may be displayed as a separate window. In still other embodiments, the image library may be incorporated into artwork 110 window in a similar manner as the scene or object image is incorporated in FIG. 4.

In some embodiments, the library shall be visually displayed as an array of thumbnails with or without image details (such as a thumbnail image 705). In other embodiments, the list may take the form of a text list with or without image thumbnails. In still other embodiments, the library may be referenced solely by one aspect of the image attribute or filtered by a specific attribute entered by the user into a text field that appears inside the window with the image library or as a separate search window. In still other embodiments, for the convenience of the user the image library may follow any number of standard typical data list formats as they pertain to the display of images in association with descriptive image data (for example: title, size, available surfaces, dimensional and/or angular viewing range).

In some embodiments, the library may be stored locally on the user's computer with downloads of new library additions available periodically from a remote server. In other embodiments, images may be store only on a remote server and downloaded and deleted from the user's computer as the user utilizes each image and then closes it respectively. In still other embodiments, a combination of local and remote storage may be used to store frequently access images locally while preserving the advantages of remotely storing the bulk of the image library (for example: reduced access to images and thus reduced image piracy, access to a constantly updated remote library, preservation of local storage space and better monitoring of image access for sales statistics).

In one embodiment, as indicated by thumbnail 703, when the user rolls over an image thumbnail, the available surfaces are tinted or otherwise highlighted, to show the user which surfaces in the image will be available to them for application of their artwork 110. In other embodiments, other image details may be revealed during rollover, such as range of dimension or viewing angle (for example: by animating a complete range in the thumbnail while the cursor is placed over the image thumbnail).

In one embodiment, the user is able to open the image by double-clicking on the image thumbnail with their cursor. As the image is opened from local storage or a remote server, in one embodiment a floating progress bar 704 appears to provide feedback to the user. The load bar may also communicate other activity that is happening in order to present the user with a usable image (for example: changes to dimension or viewing angle based on dimensions already input into the width, height, depth text fields or the setting of default shadow/highlight settings based on previously saved user preferences).

In some embodiments, the options for filtering the available images may include dimensions or available viewing angles. The library list may be governed by data entered by the user into a dimension or viewing angle text field or by click-drag operations made previously to other images by the user or to artwork 110 area by the user. In these embodiments, images that fit within the dimensional or viewing angle constraints provided by the user using the above methods shall be displayed normally while images that fall outside the dimensional or viewing angle constraints shall be somehow indicated (for example: by graying the image thumbnails out, by overlaying the image thumbnails with a strike-though line, or by highlighting those images that fall within constraints and not highlighting those images that fall outside constraints).

Figure 8:
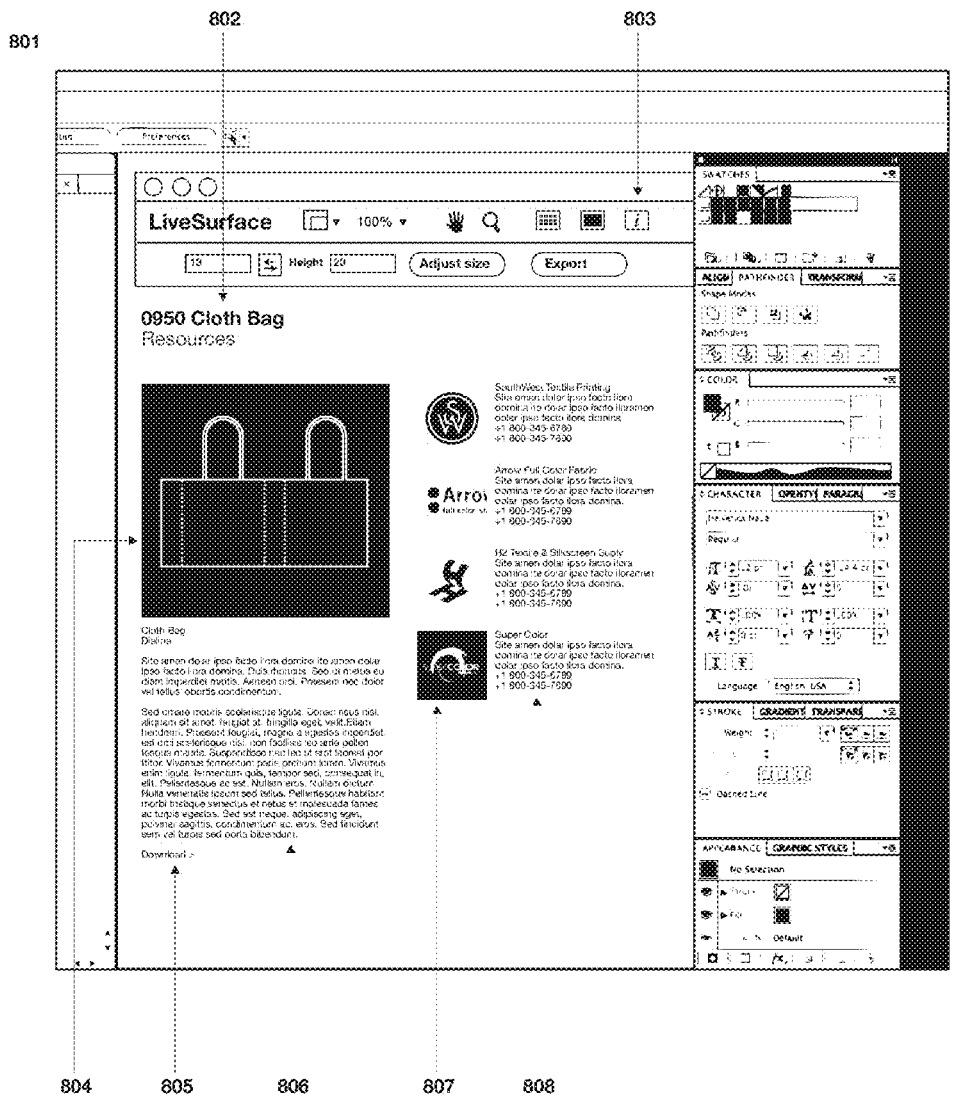
FIG. 8 is one embodiment of an interface showing additional information about a scene or object surface.

FIG. 8 is one embodiment of an interface, such as GUI 108, showing additional information about a scene or object surface, such as manufacturing specifications, ordering information and printer contact information, is made available to the user via a streamlined interface.

Screenshot 801 depicts one embodiment of a user interface on display 15, where the display of scene or object details is invoked by the user click-selecting the icon indicated by Block 803. Information displayed by the window in the center of the interface is, in some embodiments, retrieved from a locally stored file on the user's computer. In other embodiments, this information may be retrieved from a remote server. In still other embodiments, this information may be retrieved from a combination of local storage and remote server. For example: a description 802 and a title 806 of the scene or object image may be retrieved from local storage while a die line artwork 804 and printer/manufacturing company logos 807 and directory information 808 may be retrieved from ADS 109.

In some embodiments, links 805 to related files or web based information may be stored locally on the user's computer, a remote server, or both. In the example of FIG. 8, link 805 is provided to dieline artwork that the user may access in order to prepare a final for-production mechanical of their user artwork 110.

In some embodiments, the information displayed may be entered and associated with the specific scene or object image using a Content Management System of Block 102. Providing this information presents advantages to the publisher as well as the user.

In some embodiments, this information may benefit the user by offering them production and manufacturing data so that they can easily manufacture an object or print on a surface in a scene without having to look to outside resources. In other embodiments, the information may be purely instructional information or further details on the scene or object image (for example: photographer credits or geographical location).

By offering certain types of information the publisher of the information (in some embodiments being the same publisher as the publisher of the scene or object images) is able to create an additional revenue stream by charging various resources (for example: textile printers) a small fee for publication in the directory.

Figure 9:
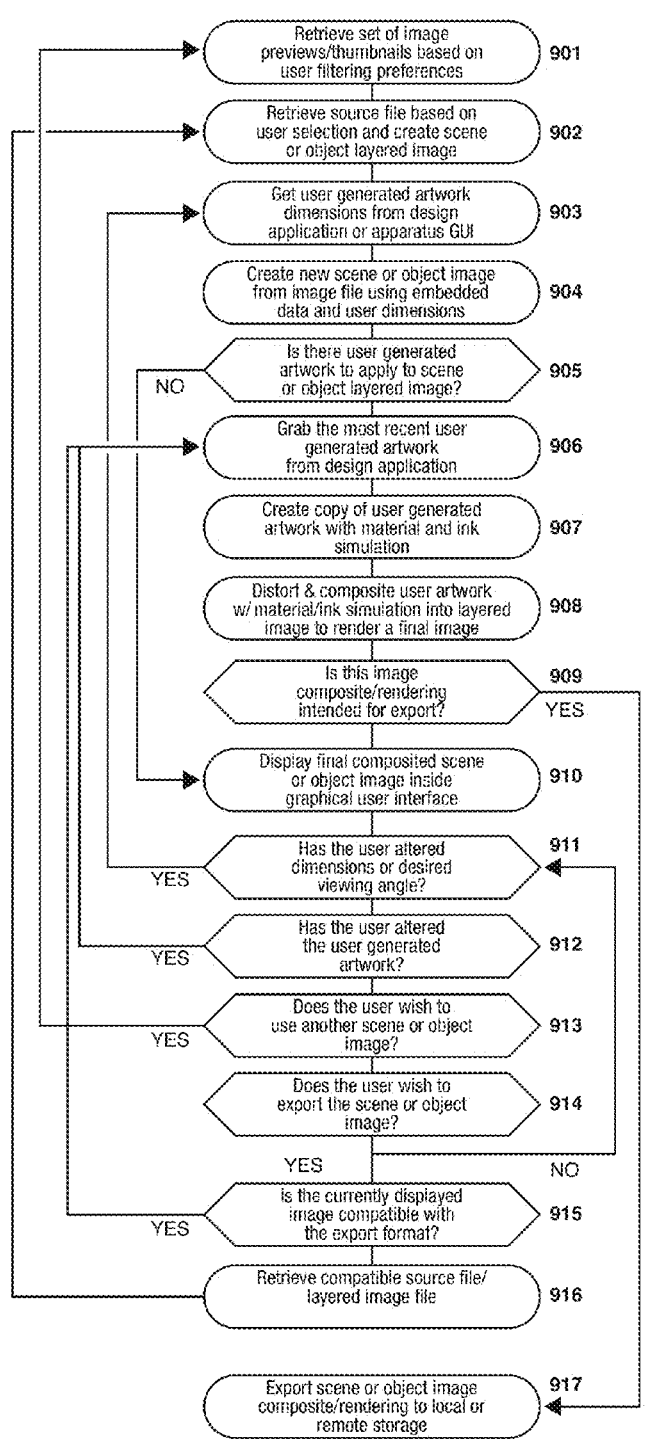
FIG. 9 is a flow chart which illustrates one embodiment of the process for creating a final composite image with artwork from target image selection to final rendering for export.

FIG. 9 is a flow chart which illustrates one embodiment of the process for creating a final composite image with user artwork 110 from target image selection to final rendering for export. The method of FIG. 9 may, for example and without limitation, be executed using the components or modules of FIG. 1.

At a Block 901, labeled "Retrieve set of image previews/thumbnails based on user filtering preferences," previews of target images 100 are retrieved from either local storage on the user's computer 10 or from a remote server 20. In one embodiment, the image previews may take the form of a thumbnail image or of a cropped section of image on display 15. The previews may be stored as part of the target image 100 file or they may be separate files that are associated with the target image file ID number in some way. The previews may be, for example and without limitation, may have the target image file ID in its name. The set of displayed thumbnails/previews are filtered before they are displayed, based on user selection or preferences, so that only appropriate thumbnails/previews are shown to the user which simplifies the process of loading the right image for the user.

At a Block 902 labeled "Retrieve source file based on user selection and create scene or object layered image," the user selects a thumbnail/preview from computer 10 to open and a message is sent to Image Resizing/Rotating Module 105 to load the associated target image 100 file. The source file, such as target image 100, is then loaded by Image Resizing/Rotating Module 105 and used to render the layered scene or object image with embedded multi-dimensional surface data. Other source (target) file elements are also used to set up a variety of image attributes. The source file elements may be, for example and without limitation, set user controlled GUI slider element limits/ratios, update existing or create new guidelines for user artwork 110 and to set GUI limits for surface dimensions.

At a Block 903, labeled "Get user generated artwork dimensions from design application or apparatus GUI," in one embodiment, Image Resizing/Rotating Module 105 obtains surface(s) dimensioning and rotation as designated by the user via the GUI. The dimensioning and rotation information may, for example and without limitation, be obtained from numerical input entered into text fields, from previously used dimensions and rotation or from click-drag operations that have been done visually within the GUI by the user.

At a Block 904, labeled "Create new scene or object image from image file using embedded data and user dimensions," Image Resizing/Rotating Module 105 obtains the dimension and rotation data and using target image 100 creates a layered scene or object image with embedded multi-dimensional surface information.

At a Block 905, labeled "Is there user generated artwork to apply to scene or object layered image?," Image Compositing Module 107 evaluates if there is artwork 110 to be applied to the embedded multi-dimensional surface(s) in the layered scene or object image. In one embodiment, the evaluation occurs by reviewing messaging that may have come from an imaging application (the "design application") that user utilizes to generate user artwork 110. These messages are flags which indicate to Image Compositing Module 107 that artwork 110 is or has been recently updated. In another embodiment, Image Compositing Module 107 may request that the design application review currently open user artwork 110 files (as in FIG. 2 where artwork 110 on left is in an open document in the design application and target image 100 is seen on the right with artwork 110 applied) and if open documents are present that it look for particular attributes that would indicate that artwork that is present is intended to be applied to the scene or object image surface(s) (for example: specifically named artwork 110 colors may be in use or guidelines that have been generated by Image Resizing/Rotating Module 105 may be present in the document and on the artboard with the artwork).

At a Block 906, labeled "Grab the most recent user generated artwork from design application," if there is artwork 110 to apply, then in one embodiment Image Compositing Module 107 reads all artwork 110 from the user's artboard 106 inside the region(s) designated by guidelines of artwork 110. In another embodiment, Image Compositing Module 107 reads artwork 110 that has been tagged by the user.

At a Block 907, labeled "Create copy of user generated artwork with material and ink simulation," Image Compositing Module 107 takes artwork 110 that it has pulled/received from the user's artboard 106 and reads each individual element of artwork 110 (for example: vector art, vector type, raster images, gradient blends and vector patterns) for special attributes that indicate that the element of artwork 110 needs to be rendered using a material or ink effect. Material and ink effects are then rendered for each appropriate element of artwork 110, other artwork elements are rendered normally (for example: using flat transparent or flat opaque color). The final rendering is then held in memory for Block 908.

At a Block 908, labeled "Distort & composite user artwork w/ material/ink simulation into layered image to render a final image," Image Compositing Module 107 distorts artwork 110 based on its relative position to the artwork guides that framed it. Image Compositing Module 107 then distorts the artwork to the embedded mesh respective of the surface to which the artwork is being applied. In the case of multiple surfaces, the artwork guidelines will contain cues to indicate to Image Compositing Module 107 which guide region corresponds to which surface region.

If, at a Block 909, labeled "Is this image composite/rendering intended for export?," the image is not being exported then, at a Block 910, labeled "Display final composited scene or object image inside graphical user interface," GUI 108 should display the final composite/rendered scene or object image generated by the Image Compositing module.

If, at a Block 911, labeled "Has the user altered dimensions or desired viewing angle?," the user has altered desired surface dimensions or viewing angle, then the flow returns to Block 903 where Image Resizing/Rotating Module 105 recreates an updated layered scene or object image that complies with the new user requested dimensions.

If, at a Block 912, labeled "Has the user altered the user generated artwork?," the user has altered any of artwork 110 (for example: moving, scaling or rotating any of the artwork elements, editing type, replacing an image or changing an element's ink or material settings) the flow of the apparatus returns to Block 906. At Block 906, Image Compositing Module 107 pulls/receives the most up-to-date copy of artwork 110.

If, at a Block 913, labeled "Does the user wish to use another scene or object image?," the user indicated they wish to use another scene or object image (in some embodiments by clicking an icon in GUI 108 such as Block 702), the flow returns to Block 901 where thumbnails/previews of scene or objects are displayed.

If, at a Block 914, labeled "Does the user wish to export the scene or object image?," the user indicates they wish to export the scene or object image (in some embodiments by clicking a button such as in Block 309 and then selecting an export format from a drop-down list of formats), then the flow moves to a Block 915, labeled "Is the currently displayed image compatible with the export format?," where the currently displayed image is checked so see if it is compatible with the requested export format. If it finds that the currently displayed image is compatible with the requested export format then the method loops to Block 906 to refresh and reapply the most current version of artwork 110. Otherwise, it continues to Block 916.

At a Block 916, labeled "Retrieve compatible source file/layered image file," a request is sent to Image Resizing/Rotating Module 105 to generate or find a source file from which it can generate a compatible layered scene or object image for export. For example: the export requested by the user may have been for a flat high-resolution rendering/composite.

Image Resizing/Rotating Module 105 then recreates the layered scene or object image in high-resolution from the source file. If the user instead was requesting a PSD version of the layered scene or object image then Image Resizing/Rotating Module 105 attempts to create a PSD version of the layered scene or object image from the respective source file.

Once a compatible layered image has been created the flow steps down until it hits Block 909 where it jumps to Block 917.

At a Block 917, labeled "Export scene or object image composite/rendering to local or remote storage," the layered scene or object image with artwork 110 applied is exported in a number of formats to computer 10 or 20 (for example: flat high-resolution or layered PSD). In some embodiments, by writing the exported image to the user's local storage in computer 10. In other embodiments by writing it to a remote server 20.

Figure 10:
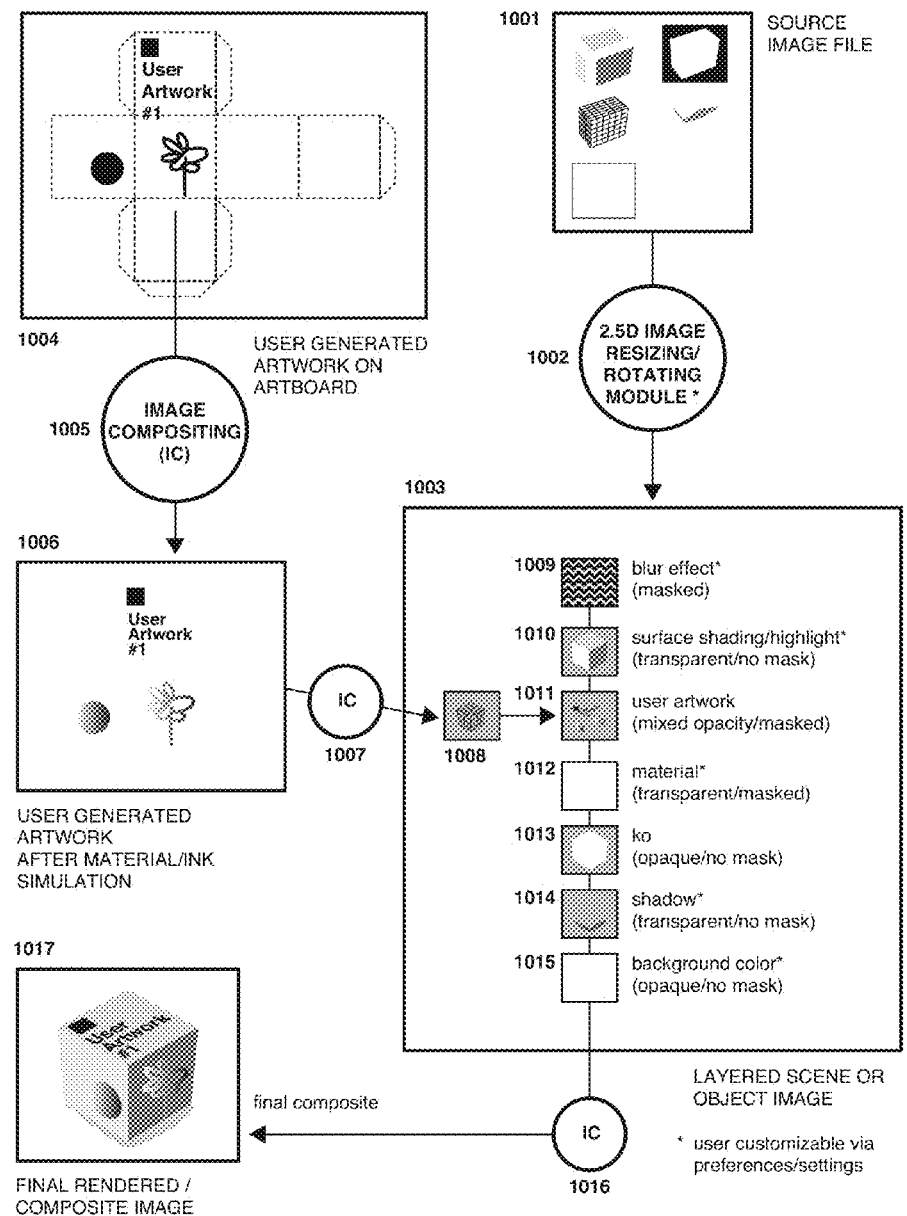
FIG. 10 is a diagram illustrating the functionality of image elements to create a final scene or object image rendering/composite with artwork.

FIG. 10 is a diagram illustrating the functionality of image elements to create a final scene or object image rendering/composite with artwork 110. The elements of FIG. 10 may, for example and without limitation, be executed using the components or modules of FIG. 1.

At a Block 1004 artwork 110 is depicted inside artwork guidelines as it might appear on the artboard in one embodiment.

Artwork 110 data and artwork guidelines data is read by Image Compositing Module 107 at Block 1005, labeled "Image Compositing (IC)," and subsequently applies material simulation, ink simulation and other effects as appropriate and based on the artwork data.

The artwork data with material simulation, ink simulation and other effects applied at Block 1006 is then distorted by the Image Compositing Module 107 at Block 1007 to conform to the embedded 3-D surface(s) depicted by Block 1008 in the layered scene or object image (Block 1003). Specifically, Block 1003 illustrates target image 100 layers as a masked blur effect layer 1009, a transparent surface shading/highlighting layer with no masking 1010, a transparent masked material layer 1012, an opaque unmasked knock-out layer 1013, a transparent unmasked shadow layer 1014, and an opaque, unmasked background color layer 1015.

The transformed artwork 110 data with material simulation, ink simulation and other effects is then used to create or is applied to a user artwork layer within the layered scene or object image at Block 1011. Block 1003 also shows that target image includes a user artwork 110 layer 1011 sandwiched between layers 1010 and 1012 for the insertion of user artwork into target image 100.

Blocks 1010 through 1015 are then composited with the user artwork 110 (Block 1011) using various transparencies and masking settings as appropriate. Some of the layers have customizable settings which may be set by the user via the GUI or by a list of defaults, in one embodiment.

As a later step in the compositing process, effects (such as the blur effect at Block 1009) are then applied to the composite/rendered image. In this example, in-camera depth-of-field is simulated using a combination of blur effect (such as Gaussian blur) and alpha channel masking.

Once all effects have been applied by the Image Compositing Module 107 at Block 1016 the final rendered/composited image is displayed in the GUI or saved to the user's local storage or saved to a remote server, which is represented by Block 1017.

FIG. 11 is a diagram illustrating two embodiments of components/elements that may be loosely grouped or associated together (for example: named with a similar prefix or placed in a single file folder) or may be embedded into a file or files. The files may be for example and without limitation, embodiments of forms or data structures of target image 100. If either is in a format that may be accessed by Image Resizing/Rotating Module 105 then these are referred to, without limitation, as an associated group of components/elements and a series of embedded components/elements a target, or source, image. Target image 100 may be used by Image Resizing/Rotating Module 105 to create the layered scene or object image file.

Block 1101 represents the first half of a list of elements that are embedded in one embodiment of a target image 100 and Block 1102 represents the first half of a list of elements that are embedded in another embodiment of a target image. Block 1103 represents one potential embodiment of the second half of the list of elements that are embedded in a target image 100.

Blocks 1104 and 1110 are thumbnail/previews of the default rendering/composite of each respective embodiment. These thumbnail/previews would in many embodiments be used by the GUI to create a catalog of images to represent the library to the user. Full resolution renderings, in another embodiment, may be also be depicted by Blocks 1104 and 1110. Full resolution renderings would be used, for example, by Image Resizing/Rotating Module 105 in creating the layered scene or object image when the Image Resizing/Rotating Module uses a 2-D approach to creating the layered scene or object image. For example: Image Resizing/Rotating Module 105 may, in one embodiment, use the high-resolution image depicted in Block 1110, shading and highlight data depicted in Block 1111, the masks depicted in Block 1112, select structures (for example: solely the 3-D magazine structure) depicted in Block 1113, shadow information depicted in Block 1114 and related preference, setting and guide art data in Blocks 1116 through 1128 to build the layered scene or object image by transforming and/or layering these 2-D components in their respective layers in the layered scene or object image instead of creating the layered scene or object image from a 3-D rendering as in the other embodiment.

Blocks 1105 and 1111 represent one or a series of discrete image and texture elements that are used by Image Resizing/Rotating Module 105 to construct the visible scene or object image and the visible aspects of the surfaces in the scene or object image (for example: images of each face of a box at Block 1105 or images of hands, a magazine and a person at Block 1111). Shadow and highlight image data is also represented by Blocks 1105 and 1111. Shadow and highlight image data is, in some embodiments, used by the Image Resizing/Rotating Module 105 to create shadow and highlight layer(s) in the layered scene or object image (such as that depicted in Block 1010). In other embodiments, the Image Resizing/Rotating Module 105 may use environmental lighting settings (such as those depicted in Block 1128) in combination with the 3-D structures or objects depicted in Blocks 1128 to create or render new shadow and highlight layers on the fly.

Blocks 1106 and 1112 represent the various masking (or alpha channel) components/elements that would be included in or embedded within target image 100. The masks may be used to create a number of elements within the layered scene or object image for masking a variety of image elements (for example: user artwork, material colors or effects). The Image Resizing/Rotating Module 105 may, in many embodiments, use other components/elements from the target image to generate masks for the layered scene or object image on the fly. For example: by combining the appropriate box surface images at Block 1106 and the 3-D structures at Block 1107 the Image Resizing/Rotating Module 105 will be able to create a box silhouette which may then be used to create surface masks as needed for the layered scene or object image file.

Blocks 1107 and 1113 represent 3-D data that would be embedded into these respective embodiments of target image 100. In Block 1107 a 3-D description of the box is given. In another embodiment, such as in Block 1113, multiple 3-D data series or 3-D object descriptions are associated or embedded into the target image that describe various image elements (for example: hands of a person holding a magazine, the magazine itself, the body of a person). These 3-D data series or 3-D object descriptions would be used by the Image Resizing/Rotating Module 105 to create a 3-D environment into which image elements could be mapped and from which a layered scene or object image could be created.

Blocks 1108 and 1114 represent shadow artwork that would be associated or embedded into a target image. In some embodiments, the Image Resizing/Rotating Module 105 uses environmental settings (for example: light source(s) and their respective qualities such as fall-off, color, softness and strength such as those depicted in Block 1128) to render shadows based on the 3-D environment. In one embodiment, this could be done using techniques that are similar to those of CAD or other 3-D software (for example: radiosity) however a pre-built shadow image has the advantage of being much faster to render than using something like radiosity.

Blocks 1109 and 1115 represent target image background artwork. In a target image that is used to create an object image, this would typically be white or another solid color whereas in a target image that is used to create a scene image the background would be of background elements that do not need to be detailed by 3-D structures or discrete images and textures. For example: in the embodiment of a target image represented by Block 1102, the background is a scene of a landscape that acts as a backdrop to the person holding the magazine. The advantage is that angle and dimension changes can still be made to the surface with only subtle distortions necessary to the background image. Furthermore, the background doesn't need to be built as a 3-D environment which saves target image creation time as well as compositing/rendering time by both the Image Resizing/Rotating Module 105 and the Image Compositing module.

Block 1116 represents preference data, in this case limits to acceptable dimensioning settings. This would, in the example of the target image with the person reading a magazine image, limit the user from changing the size of the magazine to be too large or too small to create a realistic looking layered scene image. This information may also be used by the GUI to display only images with dimensions that match the user's current artwork 110 dimensions.

Block 1117 represents preference data, in this case limits to acceptable viewing angle settings. This would, in the example of the target image with the person reading a magazine image, limit the user from changing the viewing angle of the magazine to be so oblique that it is impossible to create a realistic looking layered scene image. This information may also be used by the GUI to display only images with viewing angle ranges that match the user's requested viewing angle settings.

Block 1118 represents artwork 110 guide data which, in some embodiments, may be applied to the artwork area or artboard upon opening of the layered scene or object image created from the target image. Artwork 110 guide data, in some embodiments, indicates to the user where their artwork will be placed within the layered scene or object image and provides a kind of orientation or frame of reference as to the context of their artwork while the user works. Artwork 110 guide data, in some embodiments, indicates to the Image Compositing Module 107 where the artwork can be found (for example: all artwork that resides inside the form of the artwork guide) and how to position the artwork on the 3-D surface(s) (for example: guides which depict a flattened box would indicate to the Image Compositing Module 107 to place the artwork that resides in the square that represents the top face of the box on the top face 3-D surface in the layered object image of the box, the artwork that resides in the square that represents the left face of the box into the left face 3-D surface in the layered object image and so on).

Block 1119 represents preference data, in this case a variety of default effects settings to be associated with target image 100 where some will be accessible by GUI 108 and may be later edited by the user.

Block 1120 represents preference data, in this case a variety of default effects settings to be associated with target image 100 where some will be accessible by GUI 108 and may be later edited by the user.

Block 1121 represents slider range or preference lookup data, for example: lookup data for shadow and highlight strength sliders. In this example a slider if referenced and shows that when the GUI slider is set to a value of 0 that the actual effect of the slider is set to 20 and when the slider is set to 100 the actual effect is set to 65. Everything in between the two extremes is interpolated. This is so adjustments to settings, such as shadow strength or blur level, remain within bounds and keep the user from setting preferences on an image that make the image look distorted.

Block 1122 represents auto-adjustment data, in this example data which governs how the Image Compositing Module 107 adjusts the shadow and highlight settings to compensate for artwork 110 that is very dark or very light (here referred to as blank and white).

Block 1123 represents image identification or serialization data which may be, in some embodiments, used by a module or modules to validate user access to the image. It may also be used to track sales/billing, locate a high-resolution or other related target image 100 and pull additional information about the image.

Block 1124 represents a user id number which may be, in some embodiments, used by a module or modules to validate user access to the image. It may also be used to track sales/billing.

Block 1125 represents a file encryption key which may be, in some embodiments, used by a module or modules to encrypt or decrypt target image 100 data as well as the layered scene or object image that is created from the target image. This may be used, for example, in order to keep users from accessing the data in target image 100 or layered scene or object image without validated user access.

Block 1126 represents image detail data which may be, in some embodiments, used by a module or modules (such as the GUI) to display additional image details. For example: printing information, die line vector data or background information about the image.

Block 1127 represents layered scene or object image target structure. This is, in some embodiments, a map for creating the structure of the layered scene or object image and may be used by a module or modules (such as the Image Resizing/Rotating Module 105) to create the layered scene or object image structure. Then the other information or data that is associated with or embedded in target image 100 would be used by a module or modules (such as the Image Resizing/Rotating Module 105) to populate the layered scene or object image structure with data.

Block 1128 represents environmental data which may be, in some embodiments, used by a module or modules (such as the Image Resizing/Rotating Module 105) in creating or rendering the layered scene or object image using a 3-D environment. For example: lighting specifications such as ambient light strength, light color, light strength and air quality may be stored here.

The following is one example of the auto-adjustment referred to in Block 1122. In general, when the artwork 110 is applied to target that is generally lighter or darker than the target, the result may look less than realistic. This is because a darker tint will tend to make highlights appear too strong and the shadows look too weak and the opposite is true with artwork 110 that is too light. This effect may also occur for number of other layers. For example, a reflection layer may look too dark when dark artwork 110 is used to fill the artwork area or too light when generally light artwork is used. To compensate for this effect, Image Compositing Module 107 or 1202 may adjust the compositing based on artwork 110.

Image Compositing Module 107 or 1202 include the ability to adjust layer settings to provide more realistic rendering based on the color density of artwork 110. Thus, for example and without limitation, a highlight layer may be adjusted to be made much less visible (having a lower alpha opacity) when artwork 110 is very dense (such as predominantly black) or much more visible (having a higher alpha opacity) when artwork 110 is very light (such as predominantly white).

In other embodiments Image Compositing Module 107 or 1202 can also make further changes to the layer structures, including adding or creating new layers and completely hiding others. Thus, for example and without limitation, when artwork 110 is very light (such as predominantly white) Image Compositing Module 107 or 1202 may duplicate the shading layer to emphasize the surface more or if artwork 110 is very dense (such as predominantly black) the Image Compositing Module may create a new layer which represents an overall lightening tint that is used to simulate ink absorbtion into the materials depicted in target image's surface.

In one embodiment Image Compositing Module 107 or 1202 generates a histogram to evaluate the overall density of the artwork 110 to be displayed. In some embodiments, color density is checked both at the interior of the artwork and along the edges and then a weighted average is used to make layer modifications.

In some embodiments, if multiple regions in target image 100 are accepting multiple elements of artwork 110, Image Compositing Module 107 or 1202 obtains a weighted average of all of artwork 110 densities (weighted based on surface area of each artwork region) to establish how layers will be modified as discussed above.

In some embodiments, the layer modification process happens without user interaction, in others the user will be notified in the target image's GUI (for example, by alert dialog box) that layers will be modified. The user can cancel the modifications to leave the layers at default values. The user, in some embodiments, can then use the GUI to make their own manual layer adjustments.

In some embodiments, Image Compositing Module 107 or 1202 will, after establishing the layer modifications it needs to make (for example, setting the highlights layer to an opacity of 25% and the shadows layer to an opacity of 40%) will then refer to a layer settings look-up table to establish the actual opacities to be used on the particular target image in use.

FIG. 12 is a functional diagram which shows how various software and/or hardware components, or functionality modules, work together in another embodiment to create certain functionalities for the user. FIG. 12 includes the illustrative image of artwork 110 placed on a shopping bag. It is understood that these images and artwork 110 are for illustrative purposes, and are not meant to limit the scope of the invention in any manner. The components of FIG. 12 are generally similar to those of FIG. 1, except as where explicitly noted below.

The components of FIG. 12 include an Artwork Authoring with Plug-in Module 1201, providing a Display Module 1206, to present images on display 15, Hard Disk Storage or RAM 1207 and 1209, an Imaging Compositing Module 1202, and a GUI display or file output 1203. Hard disk storage or RAM 1207 and 1209 are generally similar to Locally Cached Source Image Data 104 and Imaging Compositing Module 1202 is generally similar to Imaging Compositing Module 107, except as explicitly noted.

Through the use of GUI 1203, a user may instruct Image Compositing Module 1202 to accept and open target image 1204, and Plug-in Module 1201 to accept artwork 100.

A target image 1204, which may be a target image 100, includes an image 1220 of an object into which the user will be applying their artwork. Target image 1204 may be a layered photographic or raster image. Target image 1204 also has an associated bounding area 1204A that includes one or more sub-bounding areas 1204B. Bounding area 1204A defines an approximate outer boundary of target image 1204. Sub-bounding areas 1204B each have associated multi-dimensional embedded data indicative of the shape of an object or objects within the sub-bounding area. In the illustrative example in FIG. 12, target image 1204 includes the photographic or raster image of bag, bound by bounding area 1204A and including one or more sub-bounding areas 1204B. Areas 1204B included embedded data 1216-1219 associated with sub-bounding areas 1204B, including, for example, the strap and bag portions of the shopping bag. Thus each bounding area 1204B is of a portion of an object, or an entire object, that may be visible in photographic or raster image, and has embedded multi-dimensional surface area data indicative of objects within the bounding area that is used to distort artwork 110 placed within the sub-bounding area, as described subsequently. In one embodiment, bounding areas 1204A and 1204B are shown as planar areas and correspond to three dimensional areas, as indicated by data 1216-1219.

Plug-in Module 1201 acts as a bridge between the authoring of vector or raster artwork 110 and Image Compositing Module 1202. Plug-in Module 1201 functions to select and export artwork. Plug-in Module 1201 may take the form of a stand-alone application, a software extension running inside a design application utilized to generate artwork 110, or an extension to Image Compositing Module 1202.

First, target image 1204 is provided into Image Compositing Module 1202 by the user via GUI 1203, the Image Compositing Module loads surface data the target image 1204 or from a file or data set associated with the target image corresponding to bounding areas 1204A and 1204B. Thus, for example, the data corresponding to sub-bounding areas 1204B may be sent via a file or set of data via RAM or via a file or set of data written to the computer's memory 11 as Hard Disk Storage or RAM 1205.

Sub-bounding areas 1204B may include one or more discrete regions that are stored as a list of curve or line points, a sequence of center points and x,y dimensions or as an array of x,y points, indicated as data 1216-1209. The bounds can be modified or relocated at any time by Plug-in Module 1201, Image Compositing Module 1202, or by the user through GUI 1203.

Plug-in Module 1201 may display bounding areas 1204A to the user visually, as indicated at Display Module 1206, so that the user can position element of artwork 110 that they wish to apply to target image 1204 appropriately within the bounds areas. In some embodiments none or only part of the bounding areas 1204A is displayed visually to the user within artwork 110 authoring application.

In one embodiment, bounding areas 1204A are presented in Display Module 1206 (as example and without limitation as in Region 202 or 205) as flat representations of portions of target image 100 that may appear three-dimensional in the target image and for which surface data is included to distort artwork 110 so as to make the artwork appear on objects in the target image. For example, the bounding areas could be the flat pieces of cloth that make up a shopping bag in FIG. 2 or 12.

Plug-in Module 1202 reads the target image 1204 and embedded information corresponding to bounding areas 1204A and 1204B, crops the artwork 110 to the bounding areas, and provides the cropped file (via data in memory or a file saved to Hard Disk Storage or RAM 1207) to Image Compositing Module 1202. The reading and/or cropping may be triggered either having Plug-in Module 1202 monitoring a user interaction (such as the push of a GUI button or selection of a menu command either inside the artwork authoring application or outside the application, not shown), or by Plug-in Module 1201, as commanded through the design application or by Imaging Compositing Module 1202 detecting a change with the element of artwork 110 in the artwork authoring application.

The cropped file (such as that which may be stored in Hard Disk Storage or RAM 1207) contains only the artwork 110 that is contained within bounding area 1204A. Portions of the original artwork that fall inside bounding area 1204A, such as the artwork within Display Module 1206) are included in the vector or raster artwork 110. Artwork 110 that falls completely outside the bounding area 1204A (such as artwork that depicted in Block 1227) is not included. Element of artwork 110 may include but are not limited to, type, raster images, vector objects, 3-D rendered objects and pattern artwork. In some embodiments the cropped file may contain only the artwork that was contained in part or in whole by the bounds area(s). For example, if some artwork elements fall outside the bounds area but area also fall inside the bounds area they will be included in the cropped artwork. In other embodiments, the cropped file may take the form of a single raster or vector file. In other embodiments, the cropped file may take the form of a multitude of raster or vector files. In still other embodiments, the cropped file may take the form of a layered file with mix of raster and vector elements.

Image Compositing Module 1202 is provided with the cropped artwork 110 file, or reads the cropped artwork data Hard Disk Storage or RAM 1207.

In certain embodiments, Reserved Name Processing Submodule 1208 of Image Processing Module 1202 further controls the compositing of the images. Specifically, Reserved Name Processing Submodule 1208 searches the vector or raster artwork 110 file for reserved names. The term "reserved name" refers to specific, pre-defined names used by imaging applications for paint fill color names ("ink names"), object attribute tags or any other number of embedded object or image attribute tags. Thus, for example, Reserved Name Processing Submodule 1208 searches each element of artwork 110, which may be for example and without limitation, vector type, shapes and lines or raster images and image effects. Reserved Name Processing Submodule 1208 determines, for example, the paint fill color names, the each element of artwork 110 and compares the names to a reserve name list. The reserve name list may be stored, for example and without limitation, inside target image 1204, associated with the target image and included along with the image or stored completely separately and associated with Image Compositing Module 1202. In one embodiment the reserved names are stored as a XML text file that the user can edit and add to simply by editing the text file attributes. In another embodiment the reserve name list is not openly accessible but may be edited and added to using a reserve name list editor that is a stand-alone application or a module included in the software. In still other embodiments, the reserved names information is not directly user accessible and may only be accessed by the Image Compositing Module 1202 or other software modules that are part of the rendering process.

Reserved Name Processing Submodule 1208 references the reserved name list make decisions on how to treat each reserved name object/file. In certain embodiments, the region having associated reserved name is filled with an image. As one example, the reserve name table may contain the following information:

TABLE 1

Example of a Reserve Name Table

| | | | | | |
|---|---|---|---|---|---|
| LS_embossed | 1 | "none" | 5 | 15 | 10 #F9F9F9 |
| LS_silverfoil | 2 | "foil.jpg" | 50 | 75 | 60 #B9BFC0 |
| LS_cardboard | 3 | "cardboard.jpg" | 1 | 100 | 100 #8C7C62 |
| ... | | | | | |

The first column is the reserved name (such as "LS_embossed"), the second column indicates what kind of material should be represented based on constant application values (for example: 1: no ink embossing 2: foils 3: uncoated paper board). The third column represents an image file that will be used to fill the reserved name object. Thus, for example, foil.jpg is an image of a flat foil surface and cardboard.jpg is an image of a flat cardboard surface. The next two numbers represent a range conversion for value data that is associated with the reserved name, where the first number would equal 0 passed from with the reserved name and the second would equal 100 passed from the reserved name. Image Compositing Module 1202 may use these endpoints to interpolate the correct value that corresponds to data passed with the reserved name. The next number is a default value if no value is passed with the reserved name. The last number is a default hex color value for setting a color to the material during the rendering process. This value may be overridden by the user. Using a look-up table such as this one simplifies the creation of various effects by grouping each reserved name into a category. For example: white foil, silver foil, and red foil may all use the same raster image for a texture map (or in another embodiment for a reflection layer).

In example of the above table, a reserved ink name "LS_embossed" results in an area being filled with a clear color fill having properties of no color itself but have a raised (or depressed) surface. A reserved ink name "LS_silverfoil" results in an area being filled with the image of a silver color foil having properties of High reflectivity, small strong specular highlight and visible reflection. A reserved ink name "LS_cardboad" results in an area being filled with an image of a tan color cardboard material having properties of low reflectivity, large subtle highlight and no visible reflection.

If an element of artwork 110 has a reserved name and is part of a group of objects, as opposed to being in an isolated file, as discussed above then Image Compositing Module 1202 removes the element of artwork 110 from the group of objects by deleting the element. Image Compositing Module 1202 then places the deleted artwork into a separate file that is named with that reserved name by creating a new file with the same bounds dimensions as the original and then pasting in the element of artwork 110 so that its position mimics exactly its original position such as the two distinct files, as represented at Blocks 1209 and 1210, with bounding information superimposed.

In one embodiment, artwork 110 with reserved names is set to a flat color (for example: black) and is merged with any other artwork 110 objects that are in the same file. This is done by using known techniques to merge paths together. All other elements of artwork 110 are merged using appropriate techniques: if there are raster items then a single raster image is created from the individual raster items.

The object/file thus created has the dimensions of the original artwork 110 with artwork elements in the same exact relative position as they were in the original artwork file. This assists Image Compositing Module 1202 to correctly position artwork 110 components later in the process.

Reserved Name Processing Submodule 1208 repeats this process until all artwork 110 with reserved names have been placed into isolated objects/file with the same respective reserved naming.

In certain embodiments, Plug-in Module 1201 processes artwork 110 in a Reserved Name Processing Submodule 1211, before being provided to Image Compositing Module 1202 using the same reserved name processing as is discussed with references to Reserved Name Processing Submodule 1208. In one embodiment, artwork 110 is processed for reserved names, and each reserved-name artwork is placed in a separate document that is named with the reserved name as in Block 1209. In other embodiments, the processed file may be prepared in other forms, such as layered files or files with masking that follows the form of the reserved name objects.

To simplify the user process for assigning reserved names to their artwork, a list of reserved names may be incorporated into the artwork authoring application GUI using a variety of methods. In one embodiment, a set of swatch colors in loaded into the artwork authoring application. These swatch colors all have reserved names assigned so that the user needs only to select their artwork element in the artwork authoring application and choose a reserved name from the reserved name swatch palette.

Aside from the reserved name itself, additional information may be contained in the reserved name. In one embodiment, this information is stored by using adding values to the reserve naming either in the application which original was used to assign the reserve naming (in, for example and without limitation, Adobe ILLUSTRATOR®) or through a lookup table that is, in one embodiment, similar in format to the reserve name lookup table. Thus, for example and without limitation, embossing depth may be communicated using the messaging format, such as LS_embossed:5. In one embodiment a look up table is used in combination with a value so that Image Compositing Module 1202 reads the value of 5, refers to the look up table under the heading of LS_embossed where it obtains a pixel value to be used for the rendered embossing bump map. Texture strength or foil shine can be communicated in the same way (LS_texturedpaper:2, LS_foil:1.0 by changing how the artwork elements are named in the artwork creation application.

After all of the reserved names have been processed and artwork 110 isolated using layers, masks, individual files or even just by adding additional image compositing coded tagging to the original artwork elements (such as the conversion of a reserved name into a reserved name table numeric code) Image Compositing Module 1202 continues on with the processing of the artwork.

Image Compositing Module 1202 then reads sub-bounding area 1204B information, or the group of bounding areas that are contained inside bounding area 1204A where, in one embodiment, each relates to a specific 3-D surface in the target image. Each sub-bounding area 1204B is copied into its own discrete file or data block as shown in Blocks 1212, 1213, 1214 and 1215. Sub-bounding areas 1204B also contain other information, including a unique identifier (such as a numeric value) for each region. Image Compositing Module 1202 references each unique identifier against a surface look-up table to decide which 3-D embedded surface receives bounding area artwork 110. Specifically, each bounding area is related to a specific 3-D surface (or multiple 3-D distortion surfaces) with its own or their own unique identifiers, such as the examples indicated by Blocks 1216, 1217, 1218, 1219, which correspond to Blocks 1212, 1213, 1214 and 1215, respectively.

The surface look-up table is, in one embodiment, embedded within target image 1204. In other embodiments, the surface look-up table may be stored externally to the target image 1204 file in a variety of formats, including an XML file. The surface look-up table in one embodiment, takes the following form:

TABLE 2

Example of a Surface Look-up Reserve Name Table

| Sub-bounds 1 | 3-D | surface 3 |
| Sub-bounds 2 | 3-D | surface 1 |
| Sub-bounds 3 | 3-D | surface 2 |

After each sub-bounding area element of artwork 110 is assigned to a 3-D distortion surface using the surface look-up table, Image Compositing Module 1202 renders each reserved name element of artwork 110, as depicted in Reserve Name Rendering Submodule 1228.

While Image Compositing Module 1202 will, in one embodiment, be capable of hundreds of rendering techniques and have a supply of hundreds of textures, raster images and rendering algorithms, the following examples represent some of the possibilities:

The rendering process, in one embodiment, may, for a reserved name such as "LS_silverfoil", replace (or fill) the elements of artwork 110 or isolated masked image tagged with the reserved name with a flat raster image of silver foil. In some embodiments, this may be a photograph of silver foil while in other embodiments this may be a rendering of silver foil made by an artist.

In some embodiments Image Compositing Module 1202 may use procedural texture techniques, which are common in the art, to fill reserved name elements of artwork 110. For example, a unique cardboard texture would be randomly and synthetically generated by Image Compositing Module 1202 and then used to fill the reserved name elements of artwork 110. This technique synthesizes a random and original texture using various mathematical algorithms, where filling an element of artwork 110 with an image just places the image "inside" the artwork element.

The rendering process may, in one embodiment, make distortions to the 3-D distortion surfaces themselves by modifying the 3-D structures embedded in target image 1204 to "push in" elements that are to be embossed or creating shadow and highlight information (such as with reserved artwork "LS_embossed"). In another embodiment actual distortions to the 3-D surface would be replaced with a bump map, as is typically in the art to render surface texture details on 3-D objects.

In another embodiment, Image Compositing Module 1202 may not only make modifications to the reserved name artwork elements themselves but may also create new compositing layers, as depicted at Block 1220, which includes layers 1222, 1223, 1224, 1225, and 1226. Specifically, layer 1222 corresponds to a shaded and highlighted layer of sub-bounding areas 1204B, layer 1223 corresponds to several of the sub-bounding areas 1204B that, in the example include the shopping bag straps, layer 1224 corresponds to distorted artwork 110 that appears on the sub-bounding area 1204B corresponding to the bag and which has a reserved name, layer 1225 corresponds to distorted artwork that appears on the sub-bounding area 1204B corresponding to the bag and which does not have a reserved name, and layer 1226 corresponds to a target image background.

In yet another embodiment, Image Compositing Module 1202 may make adjustments to some compositing layers. For example, the reserved name "LS_silverfoil" may be indicated by the look-up table to need a copy of the shading and highlights layers with an opacity that is 20% more opaque than the default shading and highlights layer. Image Compositing Module 1202 may also mask the layer to match elements of artwork 110 without overlaying other artwork elements. Image Compositing Module 1202 may then copy the shading and highlights layer (or layers), mask it (or them) and place in position above the layer into which the LS_silverfoil artwork will be rendered.

To ensure that the elements of artwork 110 reflect the original front to back ordering of the original artwork, as it was created with the artwork authoring application, Image Compositing Module 1202 (or in another embodiment, Plug-in Module 1201) assigns a position number to each reserved name artwork element as it is processed. When Image Compositing Module 1202 builds the final set of compositing layers, as indicated by Block 1220, the module will follow the position numbering sequence in setting the compositing order.

In some embodiments, Image Compositing Module 1202 renders the distortion of the normal artwork elements and the reserved name artwork elements together at once on the 3-D surface using standard Gerard or Ray Tracing shading.

All artwork elements (including "normal" artwork elements that do not have reserved names) will be assigned to their own respective artwork layer, as depicted in Block 1220.

In some embodiments the rendering of the reserved name elements of artwork 110 may occur before the artwork elements are applied to the 3-D distortion surfaces (depicted at Blocks 1216-1219). In other embodiments, it may occur after artwork 110 is distorted to the surfaces. Both have advantages and disadvantages: if the reserved name artwork elements are rendered after being distorted to the surface then effects like embossing will look more realistic because lighting and shading can be tailored more accurately based on viewing angle and known lighting (which would, in some embodiments, be stored among the target image attributes). On the other hand, rendering the reserved name artwork elements while still flat is a much simpler process for Image Compositing Module 1202 to compute.

After default artwork 110 fills have been substituted for raster images, procedural texture generation, distortions to the appropriate 3-D distortion surfaces or creation of new layer or adjustments to existing layers Image Compositing Module 1202 will set transparency defaults based on a combination of internal preferences, such as default layer settings saved inside the image file which have been created by the authors of target image 1204, and user-set preferences that are adjustable by users via the GUI which makes changes to how the Image Compositing Module 1202 composites the layers.

In one embodiment Image Compositing Module 1201 composites the shading and highlight layer, as depicted in layer 1222, together with the final rendered artwork 110 layers 1223, 1224, 1225 and 1226 to form the final image as composited image 1221, to form a completed image with realistic ink and materials.

The final image is then, in some embodiments, output to the GUI 1203, and provided to display 15 within a GUI window.

In certain embodiments, the resizing as described with reference to FIG. 6 is accomplished in the embodiment of FIG. 12. Thus, for example, sub-bounds areas 1204A are shown in Display Module 1206, which is generally similar to areas 602 and 605, and image 1221 is generally similar to areas 603 and 606.

In the above description, for purposes of explanation, numerous specific details are set forth in order to provide a thorough understanding of various embodiments of the invention. It will be apparent, however, to one skilled in the art, that the methods may be practiced without these specific details.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

Reference throughout this specification to "one embodiment," "an embodiment," or "certain embodiments" means that a particular feature, structure or characteristic described in connection with the embodiment is included in at least one embodiment of the present invention. Thus, appearances of the phrases "in one embodiment," "in an embodiment," or "in certain embodiments" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

In particular, one skilled in the art will recognize that other programming methods, algorithms, or data structures may be used other than those described above. In particular, the semantic data tables described are merely several examples of the organization of semantic data which facilitates the generation of text, including but not limited to generation in different languages and/or in different writing styles. Thus, for example, the semantic data may exist as a database on a main server, on multiple servers, and/or may be programmed into web pages.

Some portions of the detailed description are presented in terms of methods and symbolic representations of operations on text strings within a computer memory. These descriptions and representations are the means used by those skilled in the data processing arts to most effectively convey the substance of their work to others skilled in the art. A method is here, and generally, conceived to be a self-consistent sequence of steps leading to a desired result.

In addition, the steps indicated in the flowcharts may be combined or re-arranged, and may be executed entirely on one electronic device or on multiple electronic devices. The algorithms and steps presented herein are not inherently related to any particular computer or other apparatus. Various general-purpose systems may be used with programs in accordance with the teachings herein, or it may prove convenient to construct more specialized apparatuses to perform the method steps.

The execution of the methods herein is not described with reference to any particular programming language. It will be appreciated that a variety of programming languages may be used to implement the teachings of the invention as described herein. Thus, for example and without limitation, the methods, modules, or components may be programmed using Objective-C and Cocoa Frameworks on the Macintosh platform, Java or PHP on a Unix server platform, JavaScript, HTML5 or FLASH™ on a web browser platform. Furthermore, wherever a component is implemented as software, the component can be implemented as a standalone program, as part of a larger program, as a plurality of separate programs, as a statically or dynamically linked library, as a kernel loadable module, and/or in every and any other way known now or in the future to those of skill in the art of computer programming. Additionally, the present invention is in no way limited to implementation in any specific operating system or environment.

One embodiment of each of the methods described herein is in the form of a computer program that executes on a processing system, e.g., a one or more processors that are part of a system that may be networked together. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

The invention also includes all of the different combinations embodied herein. Throughout this specification, the term "comprising" shall be synonymous with "including," "containing," or "characterized by," is inclusive or open-ended and does not exclude additional, unrecited elements or method steps. "Comprising" is a term of art which means that the named elements are essential, but other elements may be added and still form a construct within the scope of the statement.

I claim:

1. A method for operating a computer executing an imaging application to render a layered image file on a computer display, where the imaging application is responsive to one or more pre-determined reserved names, said method comprising the imaging application steps of:
accepting artwork into a first layer of an image file, where the image file includes layers other than the first layer, and where the artwork, prior to being accepted into the image file, includes at least one pre-determined reserved name associated with the artwork;
determining a portion of the accepted artwork associated with a pre-determined reserved name; and
modifying layers other than the first layer of the image file, where said modifying includes providing layers to the image file other than the first layer, and in response to the associated pre-determined reserved name,
such that the modifying affects the rendering of said portion.

2. The method of claim 1, where said reserved name is an embedded object or image attribute tag.

3. The method of claim 1, where said reserved name is an ink name.

4. The method of claim 1, where said reserved name is an object attribute tag.

5. The method of claim 1, where said additional layers include a reflection layer or a highlight shadow layer.

6. The method of claim 1, where the modifying is according to a user supplied instructions.

7. A non-transitory computer readable hardware storage medium storing computer readable instructions that, when executed by at least one processor of a processing system, cause the processing system to carry out a method for operating a computer executing an imaging application to render a layered image file on a computer display, where the imaging application is responsive to one or more pre-determined reserved names, said method comprising the imaging application steps of:
accepting artwork into a first layer of an image file, where the image file includes layers other than the first layer, and where the accepted artwork, prior to being accepted into the image file, includes at least one pre-determined reserved name associated with the artwork;
determining a portion of the accepted artwork associated with a pre-determined reserved name; and
modifying layers other than the first layer where said modifying includes providing layers to the image file other than the first layer, and in response to the associated pre-determined reserved name,
such that the modifying affects the rendering of said portion.

8. The computer readable hardware storage medium of claim 7, where said reserved name is an embedded object or image attribute tag.

9. The computer readable hardware storage medium of claim 7, where said reserved name is an ink name.

10. The computer readable hardware storage medium of claim 7, where said reserved name is an object attribute tag.

11. The computer readable hardware storage medium of claim 7, where said additional layers include a reflection layer or a highlight shadow layer.

12. The computer readable hardware storage medium of claim 7, where the modifying is according to a user supplied instructions.

13. A method for operating a computer executing an imaging application to render a layered image file on a computer display, where the imaging application is responsive to one or more pre-determined reserved names, said method comprising the imaging application steps of:
  accepting artwork into a first layer of an image file, where the image file includes layers other than the first layer, and where the artwork, prior to being accepted into the image file, includes at least one pre-determined reserved name associated with the artwork;
  determining a portion of the accepted artwork associated with a pre-determined reserved name; and
  modifying layers other than the first layer of the image file, where said modifying includes turning image file layers, other than the first layer, on or off, in response to the associated pre-determined reserved name,
  such that the modifying affects the rendering of said portion.

14. The method of claim 13, where said reserved name is an embedded object or image attribute tag.

15. The method of claim 13, where said reserved name is an ink name.

16. The method of claim 13, where said reserved name is an object attribute tag.

17. The method of claim 13, where said file layers include reflection layer, surface shading or highlight layers over said layer containing the portion.

18. The method of claim 13, where the modifying is according to a user supplied instructions.

19. A non-transitory computer readable hardware storage medium storing computer readable instructions that, when executed by at least one processor of a processing system, cause the processing system to carry out a method for operating a computer executing an imaging application to render a layered image file on a computer display, where the imaging application is responsive to one or more pre-determined includes reserved names, said method comprising the imaging application steps of:
  accepting artwork into a first layer of an image file, where the image file includes layers other than the first layer, and where the artwork, prior to being accepted into the image file, includes at least one pre-determined reserved name associated with the artwork;
  determining a portion of the accepted artwork associated with the pre-determined reserved name; and
  modifying layers other than the first layer of the image file, where said modifying includes turning image file layers, other than the first layer, on or off, in response to the associated pre-determined reserved name,
  such that the modifying affects the rendering of said portion.

20. The computer readable hardware storage medium of claim 19, where said reserved name is an embedded object or image attribute tag.

21. The computer readable hardware storage medium of claim 19, where said reserved name is an ink name.

22. The computer readable hardware storage medium of claim 19, where said reserved name is an object attribute tag.

23. The computer readable hardware storage medium of claim 19, where said file layers include reflection layer, surface shading or highlight layers over said layer containing the portion.

24. The computer readable hardware storage medium of claim 19, where the modifying is according to a user supplied instructions.

25. A method for operating a computer executing an imaging application to render a layered image file on a computer display, where the imaging application is responsive to one or more pre-determined reserved names, said method comprising the imaging application steps of:
  accepting artwork into a first layer of an image file, where the image file includes layers other than the first layer, and where the artwork, prior to being accepted into the image file, includes at least one pre-determined reserved name associated with the artwork;
  determining a portion of the accepted artwork associated with a pre-determined reserved name; and
  automatically modifying the first layer of the image file, where said modifying includes changing the settings of the first layer in response to the associated pre-determined reserved name,
  such that the modifying affects the rendering of said portion.

26. The method of claim 25, where said reserved name is an embedded object or image attribute tag.

27. The method of claim 25, where said reserved name is an ink name.

28. The method of claim 25, where said reserved name is an object attribute tag.

29. The method of claim 25, where said settings include opacity or affect compositing attributes of the layer.

30. The method of claim 25, where the modifying is according to a user supplied instructions.

31. A non-transitory computer readable hardware storage medium storing computer readable instructions that, when executed by at least one processor of a processing system, cause the processing system to carry out a method for operating a computer executing an imaging application to render a layered image file on a computer display, where the imaging application is responsive to one or more pre-determined includes reserved names, said method comprising the image application steps of:
  accepting artwork into a first layer of an image file, where the image file includes layers other than the first layer, and where the artwork, prior to being accepted into the image file, includes at least one pre-determined reserved name associated with the artwork;
  determining a portion of the accepted artwork associated with a pre-determined reserved name; and
  automatically modifying the first layer of the image file, where said modifying includes changing the settings of the first layer in response to the associated pre-determined reserved name,
  such that the modifying affects the rendering of said portion.

32. The computer readable hardware storage medium of claim 31, where said reserved name is an embedded object or image attribute tag.

33. The computer readable hardware storage medium of claim 31, where said reserved name is an ink name.

34. The computer readable hardware storage medium of claim 31, where said reserved name is an object attribute tag.

35. The computer readable hardware storage medium of claim 31, where said settings include opacity or affect compositing attributes of the layer.

36. The computer readable hardware storage medium of claim 31, where the modifying is according to a user supplied instructions.

37. A method for operating a computer executing an imaging application to render a layered image file on a computer display, where the imaging application is responsive to one or more pre-determined reserved names, said method comprising the imaging application steps of:

accepting artwork into a first layer of an image file, where the image file includes layers other than the first layer, and where the artwork, prior to being accepted into the image file, includes at least one pre-determined reserved name associated with the artwork;

determining a portion of the accepted artwork associated with reserved name; and modifying the first layer of the image file, where said modifying includes replacing a portion of the artwork in the first layer with an image contained in a layer other than the first layer, in response to the associated pre-determined reserved name, such that the modifying affects the rendering of said portion.

38. The method of claim 37, where said reserved name is a reserved ink name.

39. The method of claim 37, where said image is a photograph of a surface.

40. The method of claim 37, where the modifying is according to a user supplied instructions.

41. The method of claim 37, where the image is a user supplied image.

42. The method of claim 37, where the image is generated using procedural texture techniques.

43. A non-transitory computer readable hardware storage medium storing computer readable instructions that, when executed by at least one processor of a processing system, cause the processing system to carry out a method for operating a computer executing an imaging application to render a layered image file on a computer display, where the imaging application is responsive to one or more pre-determined includes reserved names, said method comprising the imaging application steps of:

accepting artwork into a first layer of an image file, where the image file includes layers other than the first layer, and where the artwork, prior to being accepted into the image file, includes at least one pre-determined reserved name associated with the artwork;

determining a portion of the accepted artwork associated with reserved name is associated with a portion of the artwork; and modifying the first layer of the image file, where said modifying includes replacing a portion of the artwork in the first layer with an image contained in a layer other than the first layer, in response to the associated pre-determined reserved name, such that the modifying affects the rendering of said portion.

44. The computer readable hardware storage medium of claim 43, where said reserved name is a reserved ink name.

45. The computer readable hardware storage medium of claim 43, where said image is a photograph of a surface.

46. The computer readable hardware storage medium of claim 43, where the modifying is according to a user supplied instructions.

47. The computer readable hardware storage medium of claim 43, where the image is a user supplied image.

48. The computer readable hardware storage medium of claim 43, where the image is generated using procedural texture techniques.

* * * * *

UNITED STATES PATENT AND TRADEMARK OFFICE
CERTIFICATE OF CORRECTION

| | | |
|---|---|---|
| PATENT NO. | : 8,866,841 B1 | Page 1 of 1 |
| APPLICATION NO. | : 12/754419 | |
| DATED | : October 21, 2014 | |
| INVENTOR(S) | : Distler | |

It is certified that error appears in the above-identified patent and that said Letters Patent is hereby corrected as shown below:

In the Claims

Column 47, line 46, Claim 19 replace "pre-determinded includes reserved names,", with
-- pre-determinded reserved names, --

Column 48, line 43, Claim 31 replace "includes reserved names, said method comprising the image", with -- reserved names, said method comprising the imaging --

Column 50, line 5, Claim 43 replace "includes reserved names, said method comprising the imaging", with -- reserved names, said method comprising the imaging --

Signed and Sealed this
Twenty-fourth Day of March, 2015

Michelle K. Lee
*Director of the United States Patent and Trademark Office*